United States Patent
Yokoyama et al.

(12) 
(10) Patent No.: US 6,307,857 B1
(45) Date of Patent: Oct. 23, 2001

(54) ASYNCHRONOUS TRANSFER MODE CONTROLLER AND ATM CONTROL METHOD THEREOF AND ATM COMMUNICATION CONTROL APPARATUS

(75) Inventors: Tatsuya Yokoyama, Sagamihara (JP); Mika Mizutani, Mougins (FR); Osamu Takada; Eizo Hashi, both of Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/102,194

(22) Filed: Jun. 22, 1998

(30) Foreign Application Priority Data

Jun. 26, 1997 (JP) .................................................. 9-170363

(51) Int. Cl.[7] .................................................. H04L 12/56
(52) U.S. Cl. ........................ 370/395; 370/401; 370/463; 370/469; 709/230; 709/250
(58) Field of Search .................................. 370/229, 230, 370/231, 235, 389, 395, 400, 401, 463, 465, 466, 467, 469, 470, 471, 474; 709/220, 221, 222, 227, 230, 231, 232, 236, 249, 250

(56) References Cited

U.S. PATENT DOCUMENTS

| | | | |
|---|---|---|---|
| 4,539,678 | * | 9/1985 | Ambroise et al. ...................... 370/86 |
| 5,414,707 | * | 5/1995 | Johnson et al. ......................... 370/79 |
| 5,548,587 | * | 8/1996 | Bailey et al. ......................... 370/60.1 |
| 5,606,559 | * | 2/1997 | Badger et al. ......................... 370/395 |
| 5,619,499 | * | 4/1997 | Nakabayashi ......................... 370/469 |
| 5,633,870 | * | 5/1997 | Gaytan et al. ......................... 370/235 |
| 5,680,401 | * | 10/1997 | Gayton et al. ......................... 370/474 |
| 5,742,765 | * | 4/1998 | Wong et al. ........................... 370/465 |

* cited by examiner

Primary Examiner—Alpus H. Hsu
(74) Attorney, Agent, or Firm—Antonelli, Terry, Stout & Kraus, LLP

(57) ABSTRACT

An asynchronous transfer mode (ATM) controller includes a buffer memory, a transfer circuit which transfers packet data between the buffer memory and an internal memory of an associative terminal unit with a data block of predetermined length being a unit therefor, a cell transmit circuit section that subdivides or "slices" the predetermined length data block sent from the terminal memory to the buffer memory into data cells which are then sent forth to the ATM network, a cell receive control circuit operable to reconstruct or re-assemble those data cells received from the ATM network over a transfer path thereby forming in the buffer memory a predetermined length data block, and a transfer control circuit operable to permit or "instruct" the transfer circuit to transfer the predetermined length data block between the buffer memory and the terminal memory and also instruct both the cell transmit control circuit and the cell receive control circuit to transfer the data cells between the buffer memory and the ATM network over the transfer path, thereby enabling accommodation of a variety of kinds of setup configurations and/or any possible changes or alterations in ATM protocol processing as assigned to a microprocessor.

22 Claims, 24 Drawing Sheets

FIG.7

| FUNCTION | | | MPU | WIRED LOGIC |
|---|---|---|---|---|
| TRANSMISSION PROCESS | RECEIVE TRANSMISSION REQUEST FROM TERMINAL | | ○ | |
| | AAL CELL / CPCS TRAILER FORM | CRC-32 | | ○ |
| | | EXCEPT CRC-32 | ○ | |
| | AAL CELL / DATA TRANSMISSION PROCESS | CELL SEGMENTATION PROCESS | | ○ |
| | | CELL TRANSMISSION PROCESS | | ○ |
| | ATM CELL / MANAGEMENT CELL (OAM / RM CELL) TRANSMISSION PROCESS | CELL GENERATION PROCESS | ○ | |
| | | CELL TRANSMISSION PROCESS | | ○ |
| | AAL CELL / DATA CELL RECEPTION PROCESS | HEADER ANALYSIS | | ○ |
| | | REASSEMBLY | | ○ |
| | ATM CELL / MANAGEMENT CELL (OAM / RM CELL) RECEPTION PROCESS | HEADER ANALYSIS | | ○ |
| | | CELL RECEPTION PROCESS | ○ | |
| | AAL CELL / CPCS TRAILER ANALYSIS | CRC-32 | | ○ |
| | | EXCEPT CRC-32 | ○ | |
| | PROCESSING WHEN ATM CELL CONVERGENCE DETECTION | | ○ | |
| | SEND RECEIVE NOTICE TO TERMINAL | | ○ | |

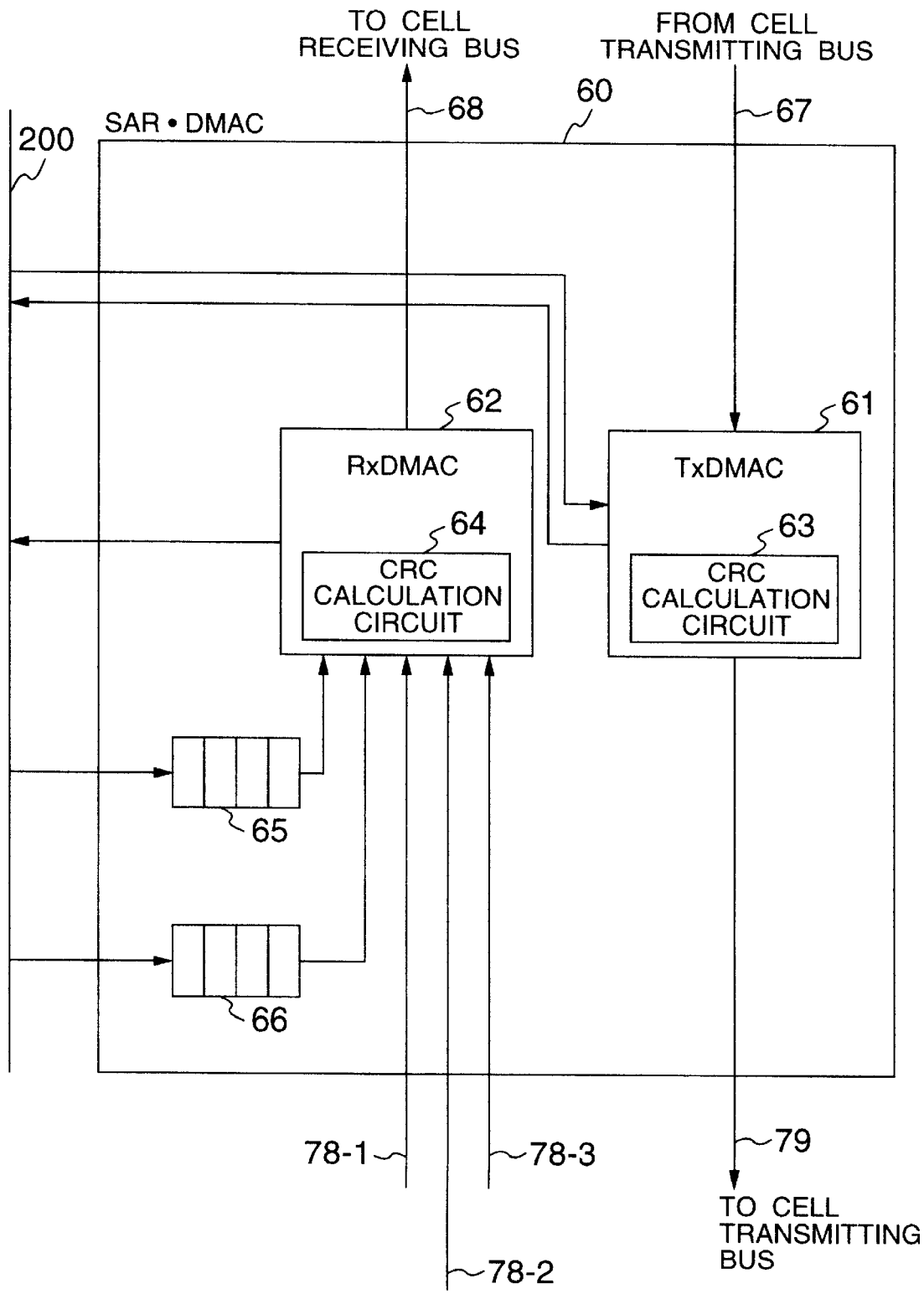

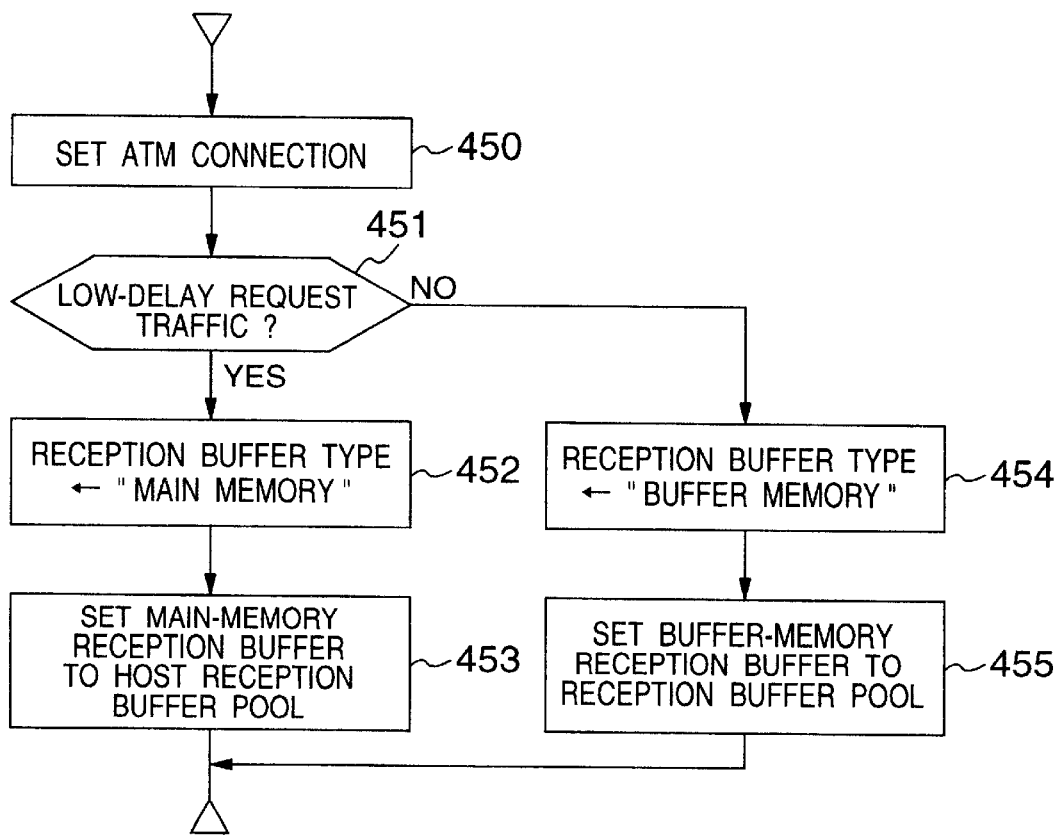
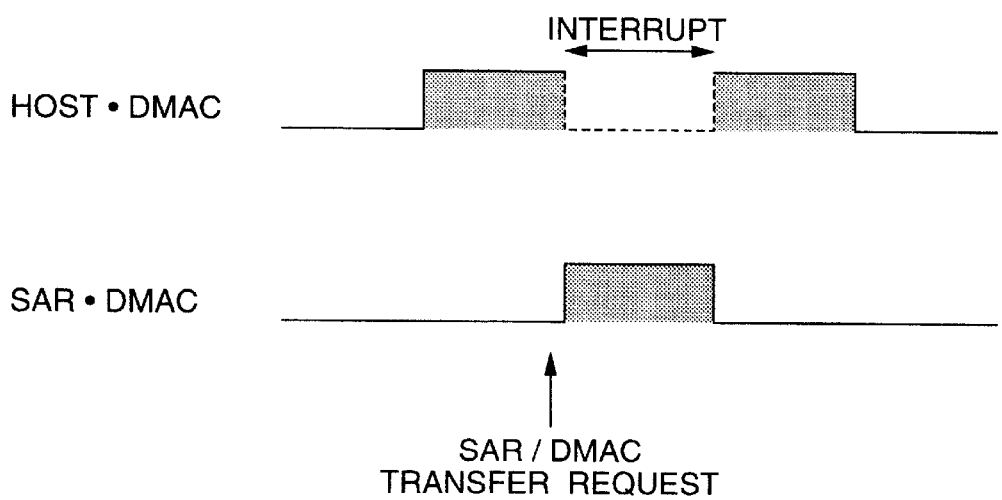

ASYNCHRONOUS TRANSFER MODE CONTROLLER AND ATM CONTROL METHOD THEREOF AND ATM COMMUNICATION CONTROL APPARATUS

CROSS REFERENCE TO RELATED APPLICATION

This application relates to U.S. patent application Ser. No. 08/775,022 filed Dec. 27, 1996 and entitled "ATM Controller and ATM Communication Control Device" by M. MIZUTANI et al., now U.S. Pat. No. 5,974,466 the disclosure of which is incorporated herein by reference.

BACKGROUND OF THE INVENTION

The present invention relates generally to data communications architecture and, more particularly, to asynchronous transfer mode (ATM) communication control apparatus for performing processing of low-level or infrastructure part of ATM protocols. The invention also relates to ATM controllers adaptable for use with the communication control apparatus in executing internal processing tasks thereof as well as control methods implementable therein.

ATM communication control apparatus is implemented and practiced for interconnection of a plurality of terminal units and communication lines of an ATM network operatively associated therewith to permit execution of communications between terminals pursuant to a preselected ATM protocol. More practically, an ATM communication control device is designed to execute processing at the infrastructure part of the ATM protocol in a way such that upon receipt of one or more variable length packets of information as generated at terminals, the controller divides each packet into a plurality of fixed length cells which are then transmitted to a communication line while simultaneously receiving cells from the line to generate one or more packets which are then passed to its intended terminal. Note that standardization of the ATM protocol per se is now in progress by the ATM Forum based on the recommendation of International Telecommunication Union (ITU).

One ATM controller is implemented using a large-scale integrated circuit (LSI) chip set which is designed to perform certain part of the processing tasks of the ATM communication control device, which may involve the processing of an ATM layer for cell transmit/receive operations and processing of an ATM adaptation layer (AAL) for subdivision and assembly of cells, namely, slicing and reconstruction, or alternatively, "segmentation" and "reassembly." A combination of such ATM layer processing and AAL layer processing will be referred to as the "ATM protocol processing" hereinafter. One example of such ATM controller may be the LSI microcomputer model μPD98401/μPD98402 used for ATM-LAN which has been disclosed in NEC Technical Bulletin Vol. 47, No. 7, 1994. This controller is designed to employ hard wired logic circuits that execute the ATM protocol processing through fixed or non-modifiable procedure routines. This architecture disclosed is capable of increasing performance. Unfortunately, this does not come without accompanying a penalty: functional inflexibility, that is, an inability to permit any change or alteration in content of processing once determined. The presently available ATM protocol is such that some processing parts still remain unstandardized, including the processing of administrative or "system management" cells which may be operation, administration and maintenance cells, these are collectively called the "OAM" cells among those skilled in the art, for use in routine maintenance and handling operations, plus resource management (RM) cells for use in controlling the congestion of traffic over communication links. It is desirable that ATM controllers be capable of accommodating any possible changes and alterations of such parts unstandardized.

One exemplary ATM controller capable of accommodating the need for processing alterations is the device called "ATMizer" which has been disclosed in a Japanese publication "NIKKEI Electronics", August 1994 at pages 1–4. This ATM controller disclosed comes with a built-in microprocessor for execution of software-based processing tasks to handle many parts of the ATM protocol processing, including cell header analysis, cell segmentation/reassembly processes and others.

SUMMARY OF THE INVENTION

It is therefore an object of the invention to provide an ATM control apparatus with a reduced capacity memory for use in subdividing and/or assembling data cells concerned.

It is another object of the invention to provide an ATM controller device capable of accommodating various setup configurations and alterations of protocol processing while reducing loads on the software-based processing required.

To attain the foregoing objects the present invention provides a specific ATM controller adapted for performing processing tasks of the ATM layer and AAL layer of a selected ATM protocol between data transfer paths of an ATM network and one or more terminals. Each terminal includes a built-in memory device whereas the ATM controller has its buffer memory. This ATM controller includes a transfer circuit which is operatively connected to the buffer memory and which is responsive to receipt of packets of data sent from a terminal for transferring the data packets between the built-in memory of the terminal and the buffer memory with a shorter predetermined length data block being a unit. The controller also includes a cell transmit control circuit which is operable, upon transmission of data blocks from the terminal memory toward the buffer memory, to subdivide or slice such data blocks into data cells which are then sent forth to the ATM network side. A cell receive control circuit is operatively coupled to the buffer memory for reconstructing or reassembling the received data cells into a predetermined length data block in the storage space of the buffer memory. A transfer control circuit is provided which is responsive to completion of a transmit/receive attempt of those data cells corresponding to one data block for generating and issuing a transfer instruction that permits the transfer circuit to effectuate the intended data transfer.

One significant advantage of the ATM controller lies in capability to employ a buffer memory with reduced storage capacity and cost. This can be said because the controller is specifically configured to achieve the data packet transmission between the terminal memory and the buffer memory with a predetermined length data block being used a unit while allowing this transmission to be done every time when those data cells corresponding to one data block are transmitted or received, which may in turn permit the buffer memory to have a reduced storage space for use in storing a mere single data block per ATM connection, any extra memory capacity is no longer required.

In accordance with another aspect of the instant invention, an ATM controller is provided which is similar in configuration to the ATM controller stated supra and which is featured by including a cell type identifier circuit and a rewritable program storage memory device as well as a microprocessor operatively associated therewith. The cell type identifier attempts to analyze the header section of a cell as presently received from the ATM network side to thereby determine or "judge" whether this cell is a data cell or not. The program memory may be an electrically erasable programmable semiconductor memory device that is arranged to and hold store therein control software programs. The microprocessor is for execution of processing tasks including, but not limited to, analysis of those cells other than the data cells as identified during the "judgment" procedure, and also certain processing tasks as required in conformity with such analysis results.

An advantage of this arrangement is that the ATM controller may successfully accommodate or "absorb" a variety of setup configurations and any possible alterations of the ATM protocol processing as assigned to the microprocessor. Another advantage lies in a decrease in load on the software processing because of the fact that the microprocessor is without the need to perform the cell type judgment tasks and data cell slicing/reconstruction or segmentation/reassembly tasks.

These and other objects, features and advantages of the invention will be apparent from the following more particular description of preferred embodiments of the invention, as illustrated in the accompanying drawings.

BRIEF DESCRIPTION OF THE DRAWINGS

FIG. 7 is a diagram showing a functional assignment scheme in the ATM protocol between a microprocessing unit (MPU) and hard wired logic circuitry.

FIG. 22 is a block diagram showing a SAR/DMAC unit used in the FIG. 20 device.

FIG. 23 is a flowchart of buffer select processing as executed by an MPU.

FIG. 25 is a timing diagram showing an operation of a bus interface circuit.

DESCRIPTION OF THE PREFERRED EMBODIMENTS

Figure 1:
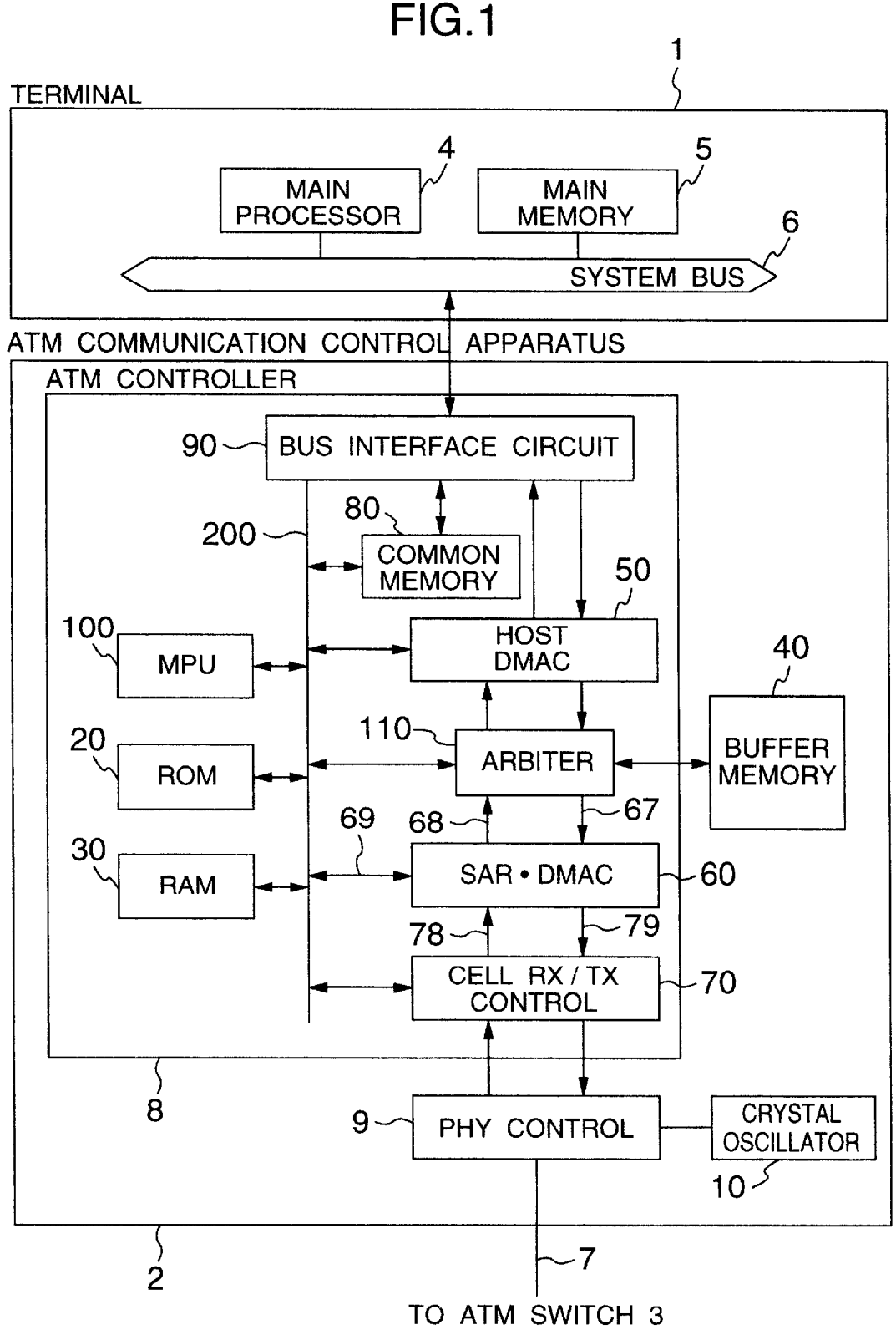
FIG. 1 is a block diagram showing a configuration of an ATM communication control device including an ATM controller in accordance with a first embodiment of the present invention.
Figure 2:
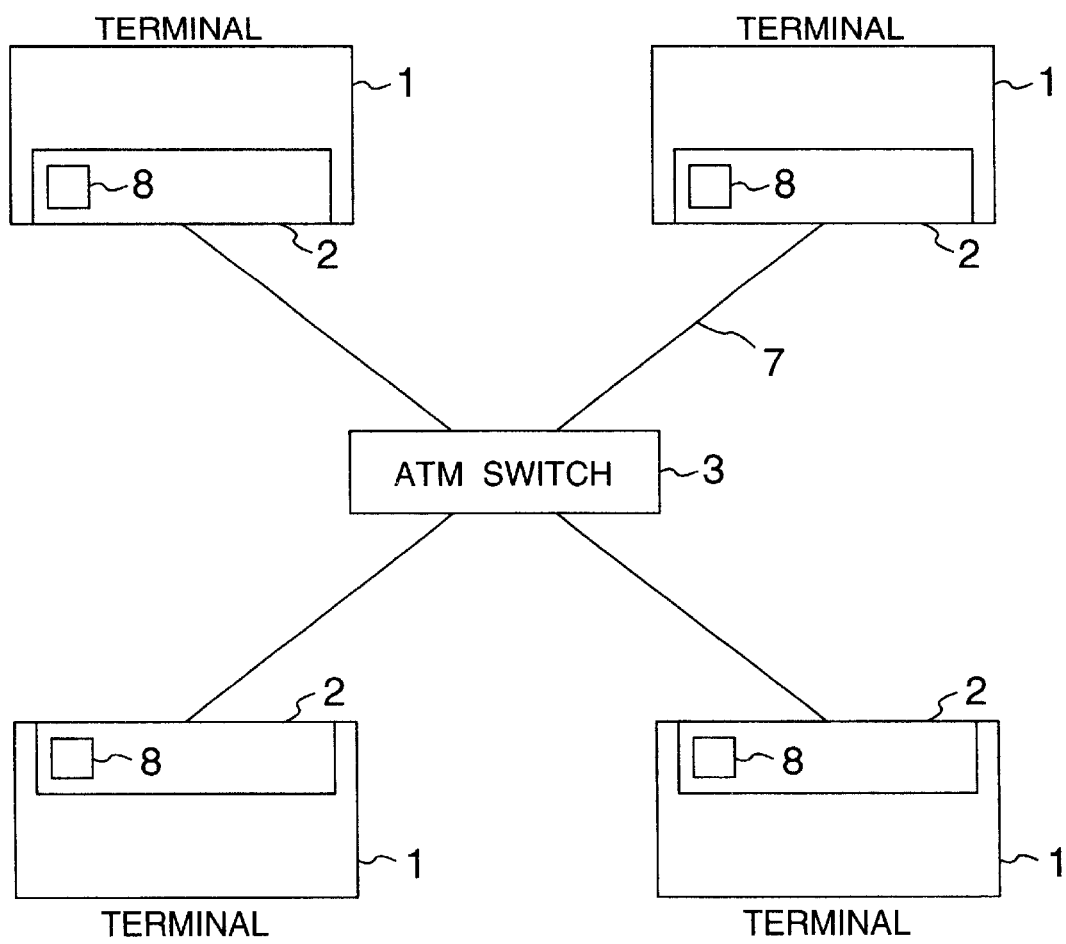
FIG. 2 is a diagram depicting a configuration of a network system with the ATM communication control device of FIG. 1 employed therein.

Referring to FIG. 1, an asynchronous transfer mode (ATM) communication control device in accordance with one preferred embodiment of the present invention is generally designated by reference numeral 2, which is employable in a telecommunications network system including an ATM switch arrangement as operatively coupled to a plurality of terminal units as shown in FIG. 2.

As shown in FIG. 2, a predefined number of terminals 1 are interconnected to an ATM switch fabric 3 via a corresponding number of data transmission paths or lines 7. The terminals 1 may be currently available workstations or personal computers (PCs). The ATM communication control device 2 is designed to perform a packet-to-cell conversion operation between terminal 1 and its associated transfer line 7.

Figure 3:
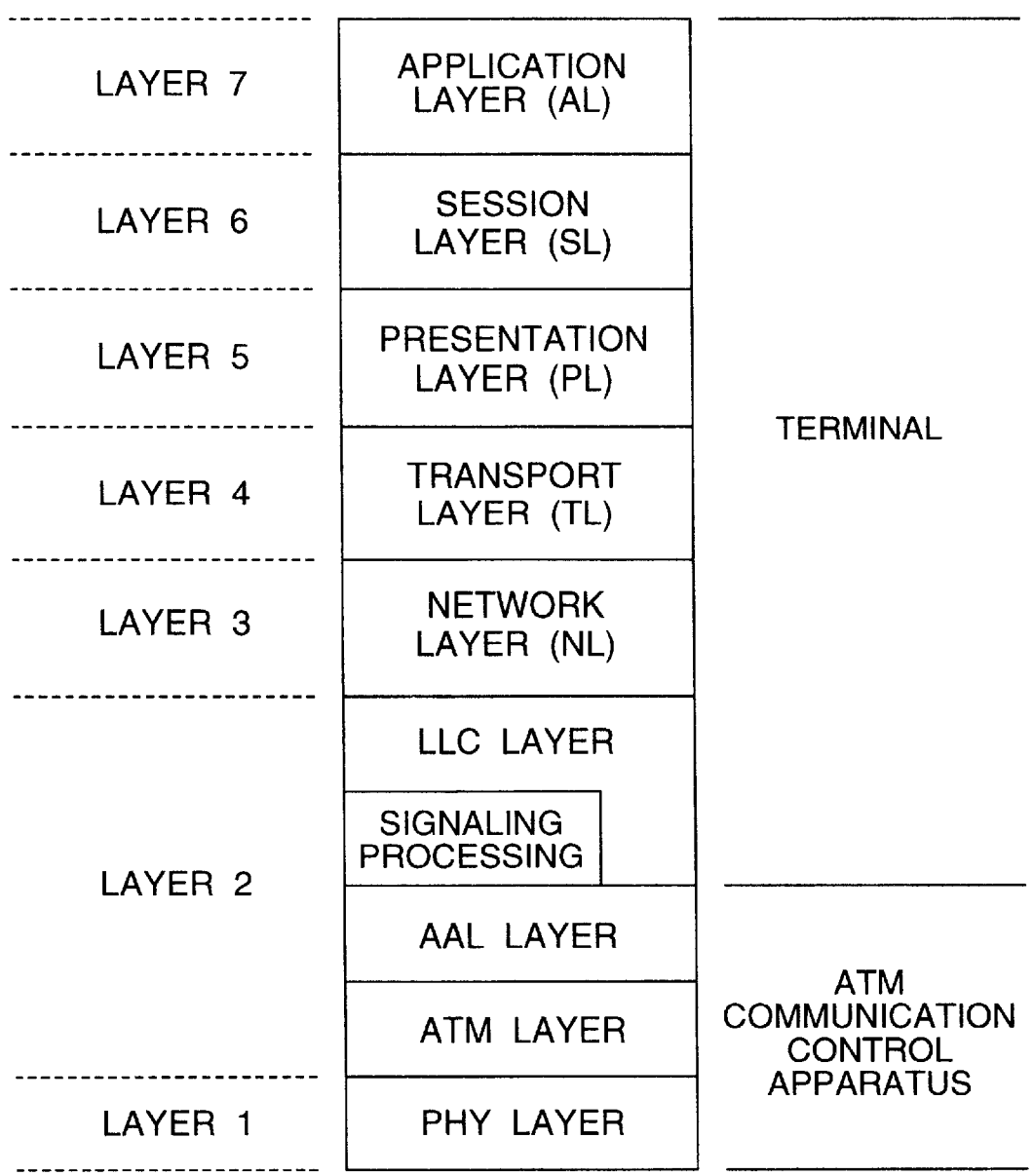
FIG. 3 is a diagrammatic representation of a multilayered communication protocol layer structure along with functions assigned thereto.

See FIG. 3, which depicts an ATM communication protocol layer structure along with function assignment between the terminal 1 and ATM communication control device 2. As shown, terminal 1 is designed to execute processing tasks of upper layers higher in level than or equal to a logic link control (LLC) layer including signaling processing for establishment of an ATM connection required, whist ATM control device 2 is to handle those lower layers less in level than or equal to an ATM adaptation layer (AAL) for subdivision and assembling of cells—say, "cell slicing and reconstruction" or alternatively "cell segmentation and reassembly" processing.

Figure 4:
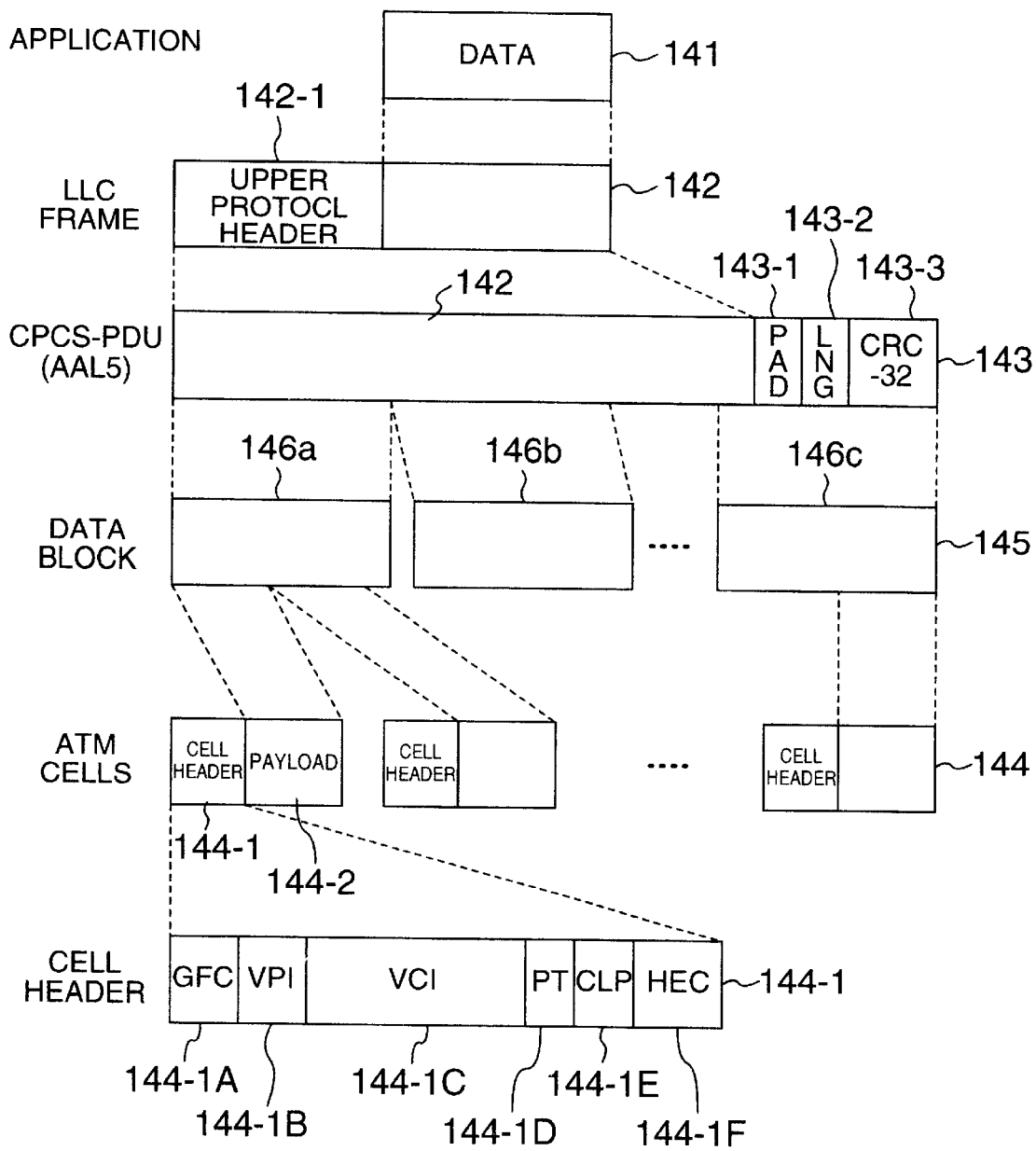
FIG. 4 is a diagram showing a relation of a packet (frame) versus ATM cells and configurations thereof.

See FIG. 4. This depiction shows a relation of packets of information versus ATM cells, the former being generated by the terminals 1 and ATM communication control device 2. As shown herein, the individual one of terminals 1 is operable to generate and issue an LLC frame 142 by adding to a variable length transmit data 141 an upper level protocol header 142-1 that is obtainable through the layer processing as to those layers higher than the LLC layer. ATM control device 2 is responsive to such AAL layer processing, for adding to the LLC frame 142 a common part convergence sublayer (CPCS) trailer, which consists essentially of a padding (PAD) field 143-1, an LNG field 143-2, and a cyclic redundancy check (CRC)-32 field 143-3, thereby generating and issuing a CPCS protocol data unit (PDU) 143. The CPCS-PDU 143 is sliced or "segmented" into a plurality of 48 byte data items 144-2 (to be referred to as "payloads" hereinafter). Each payload 144-2 is then added with a cell header 144-1 by the ATM layer processing to thereby provide cells 144. The resultant cells are subject to physical (PHY) layer processing for transmission to a corresponding one of the transfer paths 7 of FIG. 2. On the other hand, those cells received are reconstructed or "reassembled" into an LLC frame or frames in a procedure with steps in the order reverse to the above. In the illustrative embodiment the LLC frame(s) may be transported between the terminal 1 and ATM control device 2 in a way such that every data block 145 of fixed data length acts as a minimal or "unit" transmit/receive segment.

Figure 5A:
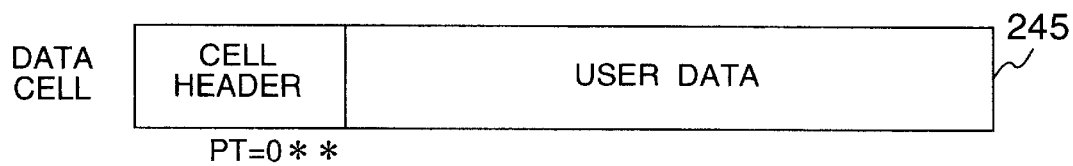
FIGS. 5A to 5C are diagrams illustrating several cell structures of different types.
Figure 5B:
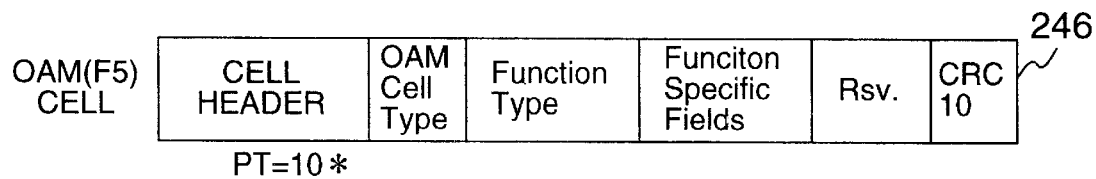
Figure 5C:
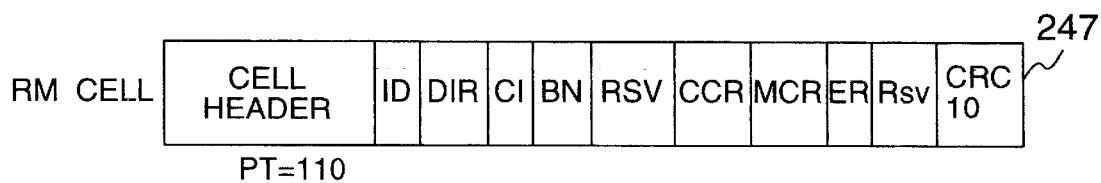

As shown in FIG. 4, the cell header 144-1 may consist of several fields, including a generic flow control (GFC) field 144-1A, virtual path identifier (VPI) field 144-1B representative of the identity of an ATM connection requested, virtual channel identifier (VCI) field 144-1C, payload type (PT) field 144-1D indicative of the type of a cell (involving assignment of the last or "final" cell in a packet), cell loss priority (CLP) field 144-1E indicating the priority level of cell abandonment, and header error control (HEC) field 144-1F storing therein error correction information bits for the cell header 144-1. As shown in FIGS. 5A–5C, the cells as used herein may be classified into several groups, which may include a data cell 245 that caries the user data, an OAM cell 246 for use in performing routine maintenance and handling operations of the network resources, and an RM cell 247 as used in controlling the data cell transmit rate. These cell types are identifiable by PT field 144-1D within cell header 144-1. Additionally, one data cell may be a text, data file (e.g. document or spreadsheet), graphics, video (i.e. movies or television broadcast programs), animation, or sound (i.e. music or conversations).

Figure 6:
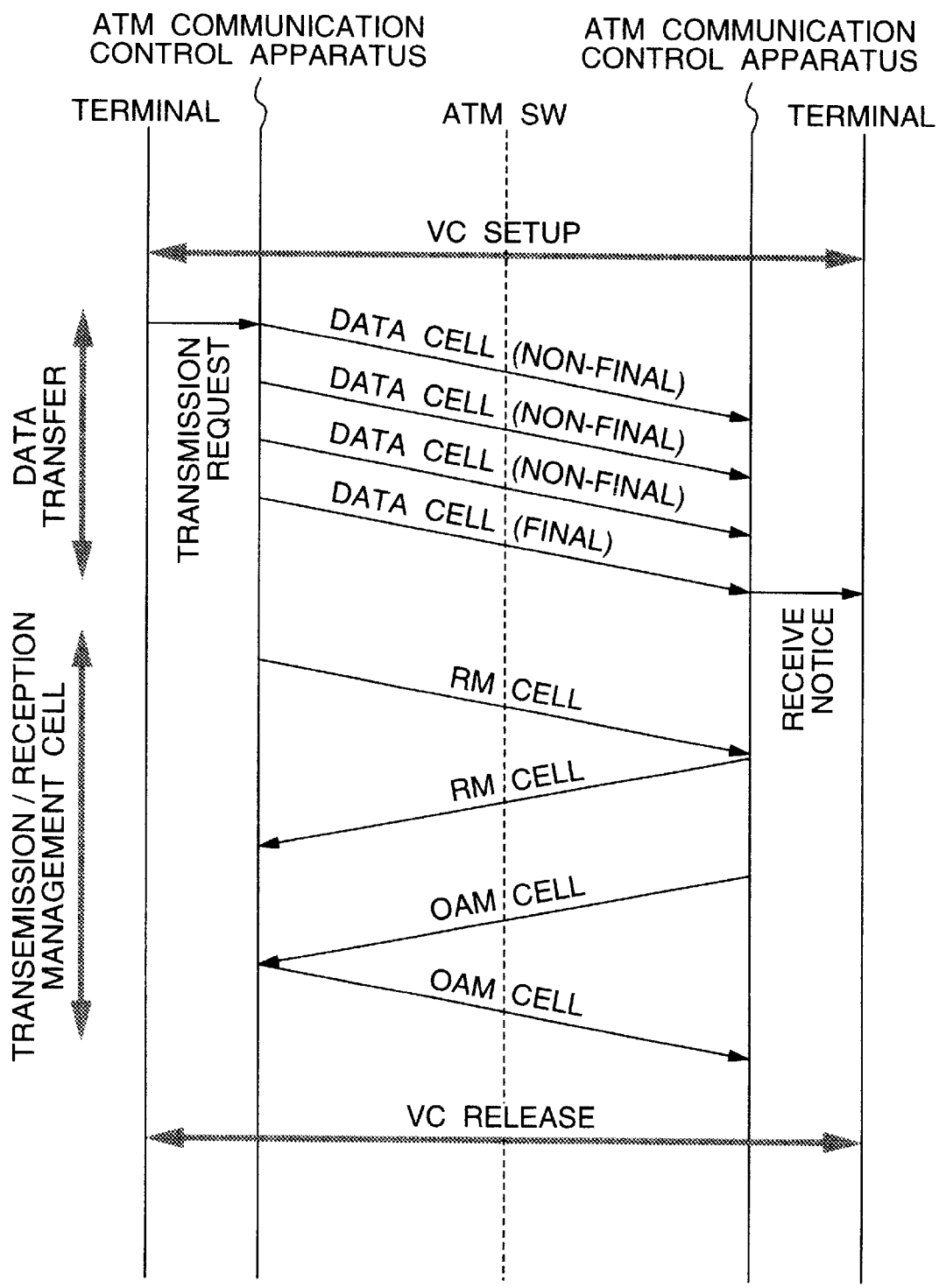
FIG. 6 is a diagram showing a communication sequence of the ATM communication protocol used.

One typical cell-transmit/receive sequence in the ATM communication control device is shown in FIG. 6. Assume that one of the terminal 1 of FIG. 2 attempts to communicate with another. If this is the case, the "source" terminal 1 first operates to set up an ATM virtual connection, or a virtual channel (VC), between itself and its "destination" terminal 1. Setup and disconnection or "release" of such VC are effectuated by the signaling processing at terminal 1. Packets of information to be sent from source terminal 1 are sliced or segmented into cells within an associated ATM control device 2 for transmission to a corresponding transfer path 7. The destination terminal also has its built-in ATM communication control device 2, in which any received cells are reassembled into a packet format which will be sent to destination terminal 1. In addition to such data cell transmission, the ATM communication control device 2 is also operable to transmit and receive a management cell or cells, such as OAM cells and RM cells, to and from other ATM communication control devices 2 and the ATM switch fabric 3. After completion of the intended cell transmission tasks, the VC is released or "freed" into the "idle" state to thereby terminate the communication concerned.

Turning back to FIG. 1, the individual terminal 1 is equipped with communication electronics, including a main processor 4, main memory 5, and system bus for interconnection between them. The ATM communication control device 2 operatively associated with terminal 1 generally includes an ATM controller unit 8, a PHY controller 9, and a quartz crystal oscillator 10. The ATM controller 8 is with functions of performing cell segmentation/reassembly processing. The PHY controller 9 is for controlling cell transmission attempts over its associated transfer path 7 leading to the ATM switch fabric 3 of FIG. 2. ATM control device 2 also includes a buffer memory 40 for storage of transmit/receive cells and those cells under segmentation and reassembly processing. The oscillator 10 is connected to PHY controller 9 for use in electrically driving PHY controller 9.

The ATM controller 8 is constituted from a bus interface circuit 90 as used in providing a connection to the system bus 6 of terminal 1, a master or "host" DMAC unit 50 that performs packet transmission between the terminal main memory 5 and the buffer memory 40, a SAR/DMAC 60 for execution of cell segmentation and reassembling operations in the storage space of buffer memory 40, a cell transmit/receive (TX/RX) control unit 70 for performing cell generation and analysis operations, a microcomputer or microprocessor (MPU) 100, an electrically erasable programmable read-only memory (EEPROM) 20 for storage of required control software programs for use with MPU 100, a random access memory (RAM) 30 that functions as a work memory of MPU 100, an arbiter 110 which is operable to adequately manage or "mediate" the host DMAC 50, SAR/DMAC 60 and MPU 100 when access to buffer memory 40 in a way such that arbiter 110 determines which one has the first priority when two or more of them simultaneously attempt to access buffer 40, a common memory 80 for use in sending and receiving control information bits between main processor 4 and MPU 100, and internal bus 200 for interconnection of respective internal parts of ATM controller 8. Additionally, PROM 20 may be a "Flash" EEPROM or any equivalents thereto.

Very importantly, the program(s) as prestored in the EEPROM 20 in the form of codes is/are at least partly rewritable or reprogrammable by the main processor 4 via the bus interface 90 and internal bus 200. Note that the ATM controller 8 comes with its own built-in quartz crystal oscillator (not shown) which is designed to generate a clock signal permitting respective electronic parts or components of this controller to operate in a way synchronized with such clock signal. It is noted that the buffer memory 40 may be incorporated in the ATM controller 8 instead of placing it in the ATM communication control device 2.

See FIG. 7, which depicts in table format one exemplary scheme of allocation of major functions of the ATM protocol processing as executed by the ATM controller 8 of FIG. 1. As shown, the ATM communication control device 2 is arranged so that its built-in MPU 100 is in charge of dealing with specifically selected processing tasks with increased possibility of a processing content change or alteration as required by end users, including, but not limited to, the management cell creation/analysis routine, and interfacing with terminal 1 as expected every time when one data block of packets takes place, whereas the hard wired logic unit is designed to handle those processing tasks which strictly require high-speed executability rather than the task content modifiability or alterability, such as for example CRC calculations and cell-segmentation/reassembly operations. With such "distributed task/function execution" scheme, it becomes possible to reduce workloads on MPU 100 of ATM controller 8 in the illustrative embodiment.

Figure 8:
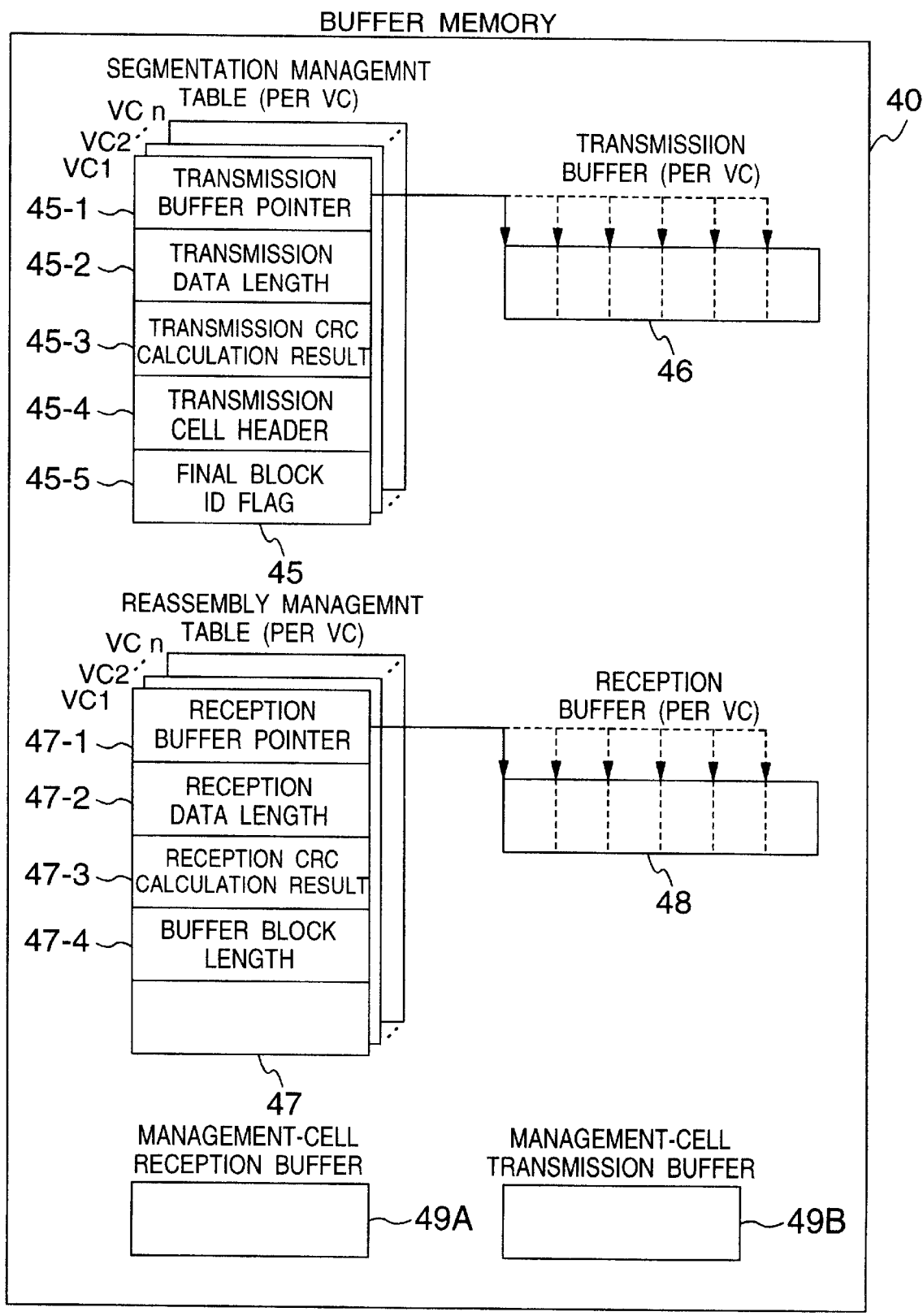
FIG. 8 is a diagrammatic representation of a configuration of a table as defined in a buffer memory.

An internal configuration of the buffer memory 40 is shown in FIG. 8. As shown in FIG. 8, buffer memory 40 has several storage regions, including a divisional management table 45, transmit buffer 46, reassembly management table 47, receive buffer 48, management-cell receive buffer 49A, and management-cell transmit buffer 49B. The divided management table 45 is for use in storing therein certain management information bits the SAR/DMAC 60 will utilize during cell segmentation (transmit) processing. Reassembly management table 47 is for storing management information as will be used by SAR/DMAC 60 during the cell reassembly (receive) processing. Transmit (TX) buffer 46 is for storage of packets being transmitted. Receive (RX) buffer 48 is to store therein a reassembled data block of receive packets. Management cell receive buffer 49A is for storing certain management cell or cells being transmitted, whist management cell transmit buffer 49B is for storing those of cells received. A set of these tables and buffer sections may be provided with respect to each VC.

As shown in FIG. 8, the divided management table 45 consists essentially of five major storage segments 45-1 to 45-5. The first segment 45-1 is for storage of a TX buffer pointer which holds therein a storage location or address of a to-be-next-transmitted payload in the TX buffer 46. The second one 45-2 is a TX data length storage. The third one is an "on-the-fly" calculation result storage 45-3 which stores therein a temporal or "in-the-process" CRC calculation result that will be updated in value every time a new cell is sent forth. The fourth one is a TX cell header 45-4 for storage of a template of cell header 144-1 as added to payload 144-2. The last one 45-5 is for storage of a last or "final" block indicator flag.

The reassembly management table 47 includes an RX buffer pointer 47-1 which holds therein the address of a to-be-next-received cell in the RX buffer 48. Table 47 also includes an RX data length 47-2, a receive-CRC calculation result 47-3 indicative of the last CRC calculation result which may be updated every time a cell is received, and a buffer block length 47-4.

Incidentally, where the TX buffer 46 and RX buffer 48 are designed to have capacity large enough to store therein the entire part of LLC frame 142 (see FIG. 4), a storage capacity of 4 kilobytes (KB) is typically required for each VC, which would result in that a large-capacity memory device of high cost must be employed as the buffer memory 40. In addition, it will possibly happen that the LLC frame 142 of variable length is of 64 bytes or more or less. This might serve to let buffer memory 40 be low in use efficiency or utilizability. In view of this, the illustrative embodiment is arranged so that TX/RX buffers 46, 48 are equal in capacity to the data block 145 (FIG. 4) that is subdivided from LLC frame 142 to thereby enable successful storage of six payloads 144-2 at a time. Typically, the capacity of buffers 46, 48 may be set at 288 bytes. Note however that the RX/TX buffer capacity setup and the significance of data block 145 should not exclusively limited to the values stated above.

Figure 9:
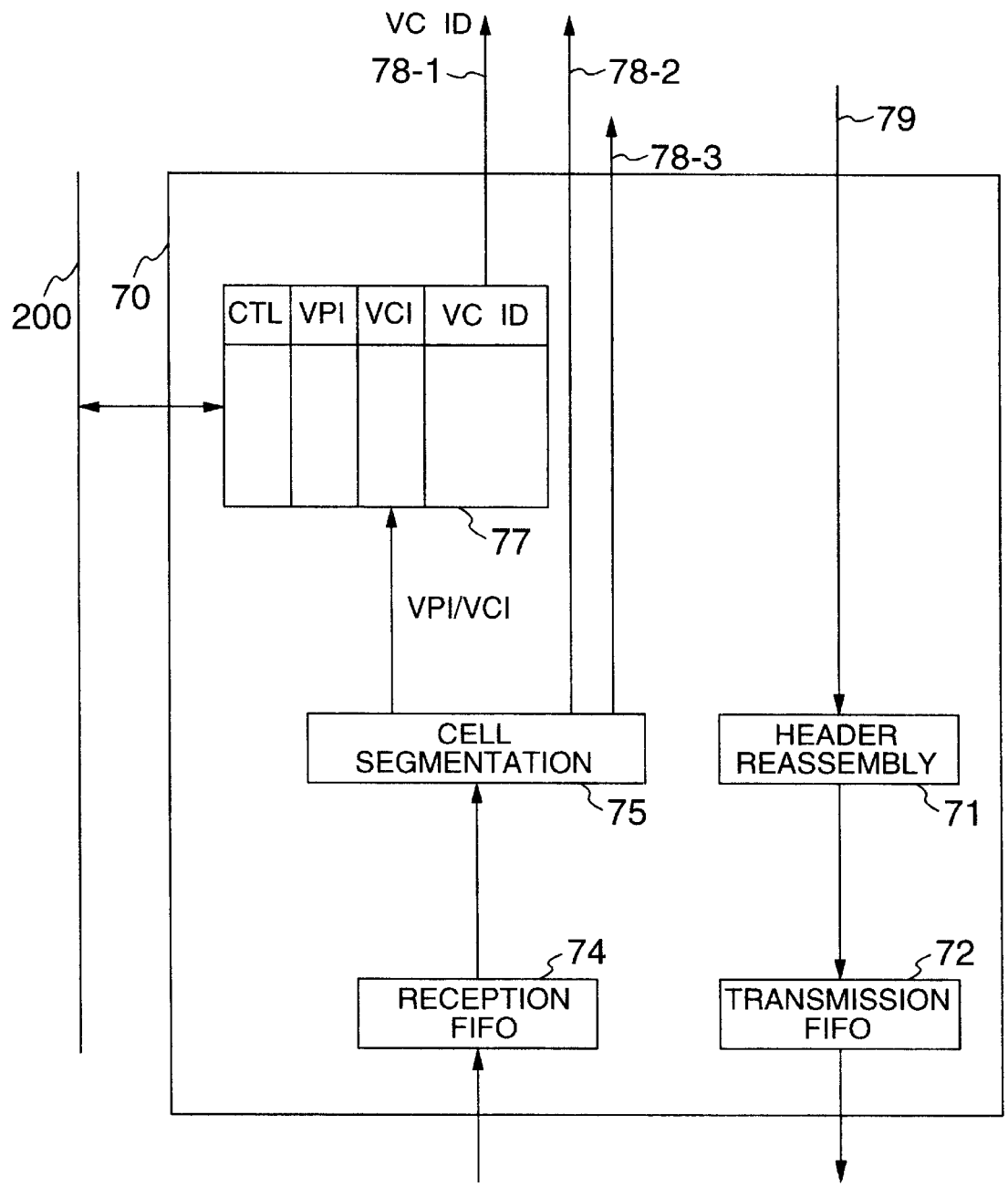
FIG. 9 is a block diagram showing a configuration of a cell transmit/receive control unit.

Referring to FIG. 9, the cell transmit/receive (TX/RX) control unit 70 includes a fast-in/fast-out (FIFO) memory 74 which is for temporarily storing therein a cell or cells received. This RX-FIFO memory 74 is operatively coupled to a cell segmentation processing unit 75 which is operable to disassemble or "segment" those cells stored in FIFO 74 to send forth resultant cell segments disassembled. Cell segmentation processor 75 is in turn connected to a contents-addressable memory (CAM) 77 that effectuates conversion of cell routing information for identification of a VC. TX/RX controller 70 also includes a cell-header reassembly processing unit 71, and a TX-FIFO memory 72 operatively associated therewith. Cell-header reassembly processor 71 functions to generate cells to be transmitted through reassembly of headers concerned. TX-FIFO 72 is for temporarily storing therein the resulting cells from cell-header reassembler 71.

An operation of cell TX/RX controller 70 is as follows. The cell segmentation processor 75 transfers both the cell payload and the PT field 144-1D (cell type identifier) in the header of FIG. 4 toward the SAR/DMAC 60 while at the same time passing to VC identification CAM 77 both the VPI field 144-1B and VCI field 144-1C shown in FIG. 4. CAM 77 prestores therein a plurality of pairs of VPI/VCI and VC identifier (connection identifier) as registered under control of MPU 100. CAM 77 attempts to search for one specific VPI/VCI-VC pair which is identical to the VPC 144-1B and VCI 144-1C (FIG. 4) as input from cell segmentation processor 75 to thereby extract the VC identifier of such "matched" pair, which is then passed to SAR/DMAC 60.

Figure 10:
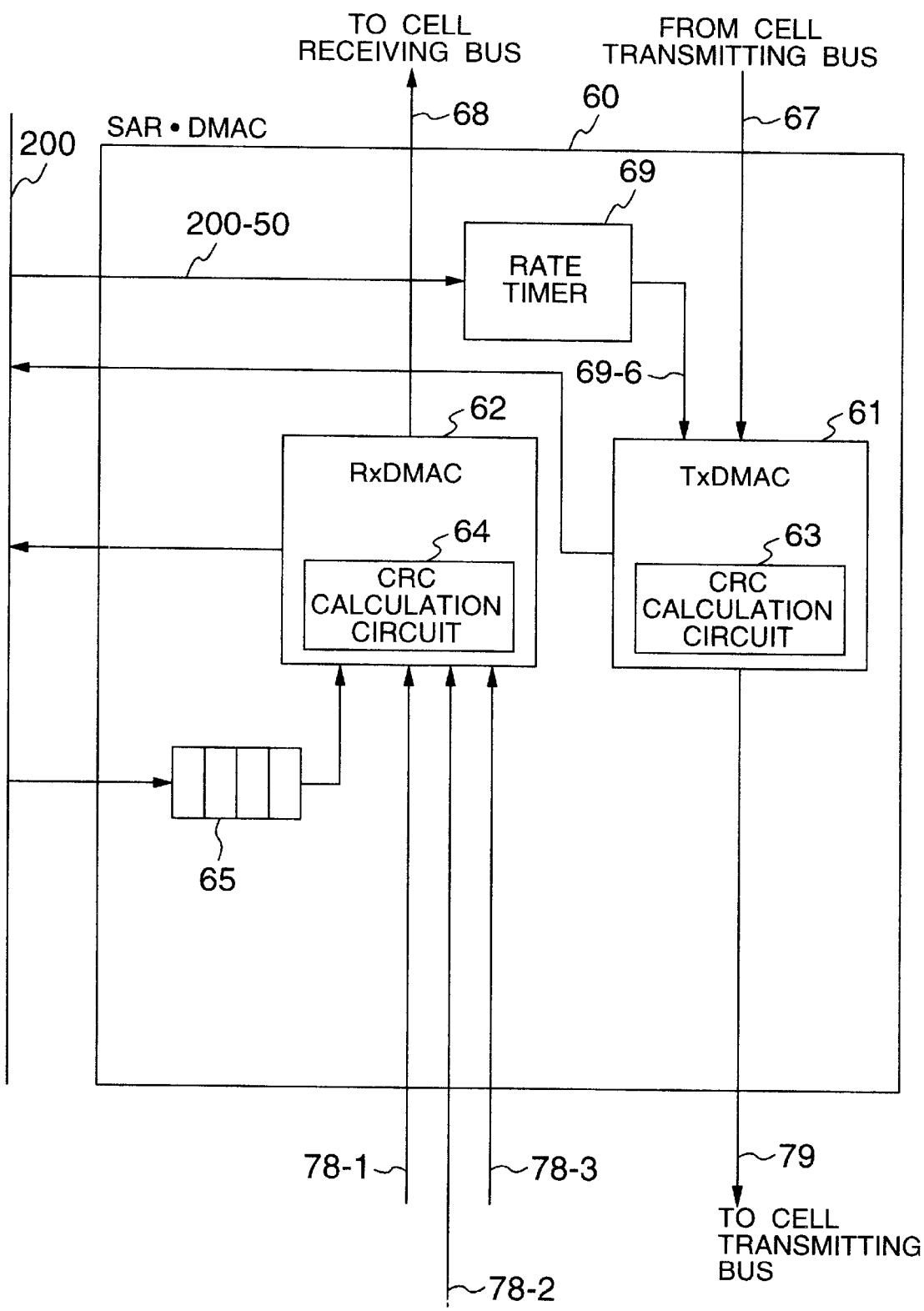
FIG. 10 is a block diagram showing a configuration of a segmentation and reassemble direct memory access controller (SAR/DMAC).

As shown in FIG. 10, the SAR/DMAC 60 includes a receive DMAC (RxDMAC) module 62 that is designed to function as a receive direct memory access controller for those cells presently received thereat, which makes use of the reassembly management table 47 shown in FIG. 8 to sequentially store received cells into the RX buffer 48 of FIG. 8. SAR/DMAC 60 also includes a transmit DMAC module 61 that may act as a cell-transmit direct memory access controller which uses the segmentation management table 45 of FIG. 8 to disassemble or segment the packet data presently stored in the TX buffer memory 46 into cells for sequential transmission. RxDMAC 62 is connected with a receive buffer pool 65 for storage of an address or addresses of free or "idle" buffers in the plural RX buffers 48. TxDMAC 61 is operatively coupled to a rate timer circuit 69 which executes scheduling processing for those cells being transmitted. As shown, Tx/RxDMACs 61, 62 have built-in CRC calculator circuits 63, 64, respectively, each of which is to perform CRC calculations for error correction.

Figure 11:
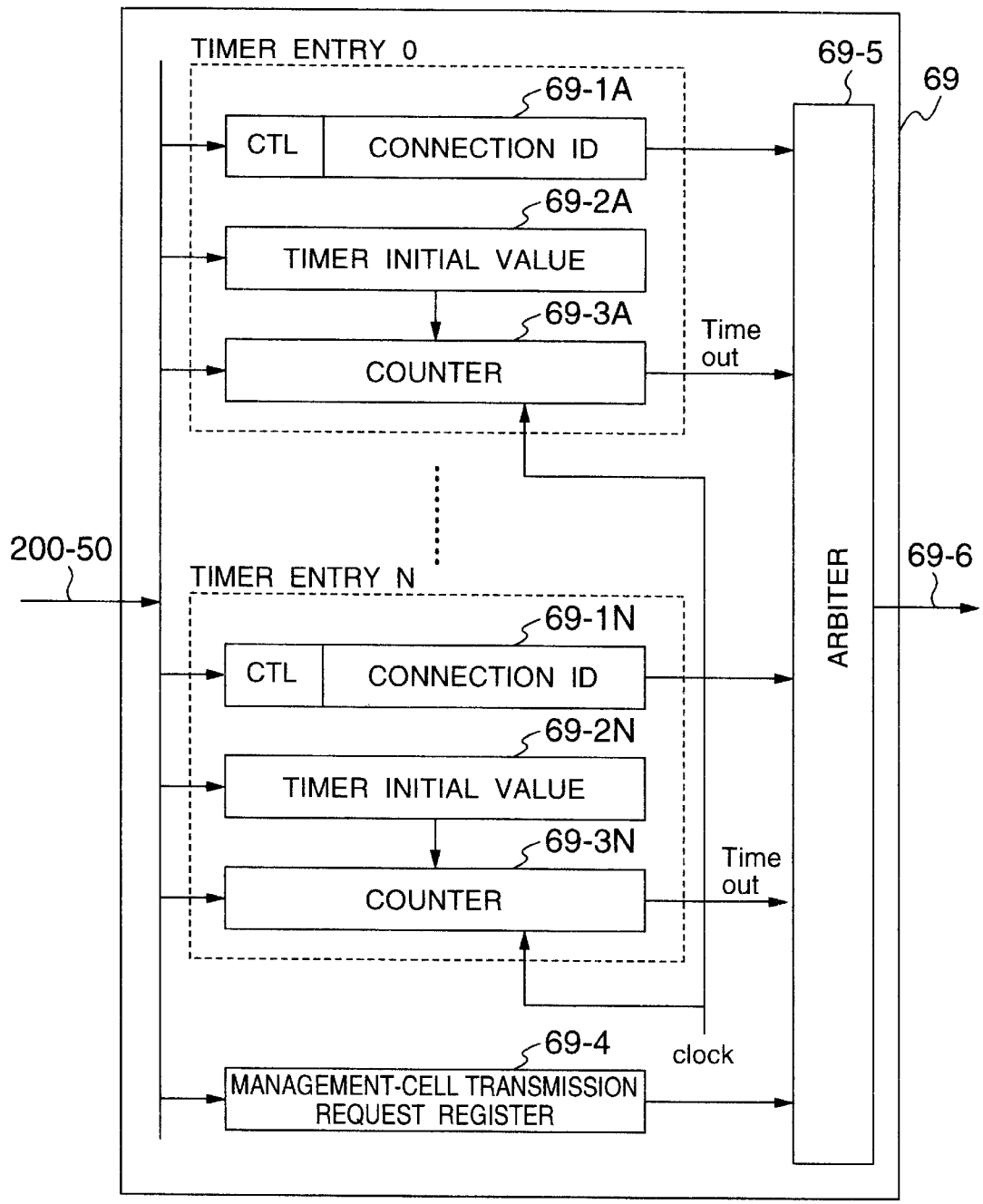
FIG. 11 is a block diagram showing an internal arrangement of a rate timer.

The rate timer 69 of FIG. 10 may be configured as shown in FIG. 11. Rate timer 69 includes a predefined number of timer entry sections 0, 1, 2, . . . , n, where "n" is an integer. These entries are for generating and issuing a data cell transmit request with respect to each VC. Timer 69 also includes a register 69-4 interconnected in parallel to entry sections 0–n, which register is for generating and issuing at its output a management cell transmit request concerned. Timer entries 0, 1, . . . , n and register 69-4 have outputs coupled to an arbiter unit 69-5 which is operable to receive those transmit requests as passed from parts 0–n, 69-4 and "mediate" them in such a way as to determine an appropriate transmission order among them.

In FIG. 11 a respective one of the timer entries 0, 1, . . . , n includes a parallel combination of three units: a connection identifier storage 69-1, timer initial value storage 69-2, and counter 69-3. The first timer entry #0 consists essentially of a connection identifier storage 69-1A, timer initial value storage 69-2A, and counter 69-3A. Similarly, the n-th entry n has a connection identifier storage 69-1N, timer initial value storage 69-2N, and counter 69-3N. Each timer initial value storage 69-1A, . . . , or 69-1N is for storing therein a connection identifier to which the identification information of VC is registered. Each of timer initial value storages 69-2A to 69-2N is to permit information designating the transmit time interval of such VC cells to be registered therein. Counters 69-3A to 69-3N may be timer counters. Upon receipt of a new packet transmit request from the terminal 1, the MPU 100 attempts to find any timer entry unit or units with no registration done therefor and then register the VC identification information along with transmit interval-designating information which may correspond to the new transmit request. At the timer entry with such registration effectuated, its timer counter 69-3K (where "K" is one of the suffixes A to N) is rendered operative performing a count-down operation from the value as stored in its associated timer initial value storage 69-2K in a way synchronized with a clock signal supplied thereto; when the count-down value is zero, i.e. at "time out" instant, then the transmit request is passed to arbiter 69-5. The foregoing operations will be recurrently performed with respect to any one of the remaining timer entries whereby the transmit requests regarding the VCs registered will be output from respective entries 0, 1, . . . , n at a specified time intervals registered. While this is done, management cell transmit request register 69-4 passes as a transmit request the information registered from MPU 100 to arbiter 69-5.

Upon reception of the transmit request from one timer entry unit, the arbiter 69-5 designates the VC identification information as supplied along with the transmit request to thereby derive a corresponding cell transmit request 69-6 to the TxDMAC 61 of FIG. 10. Alternatively when receiving the transmit request from the management cell transmit request register 69-4, arbiter 69-5 designates a corresponding management cell for outward delivery of such transmit request. Where multiple transmit requests are received from the timer entries 0, . . . , n and register 69-4 at a time, arbiter 69-5 executes parallel-to-serial conversion thereby to "integrate" such requests into a serial data bit stream 69-6 for outward sequential transportation. Note here that where appropriate, arbiter 69-5 may alternatively be arranged to carry out "priority-based" request delivery in a way such that different priority levels are preassigned to the timer entries 0–n and register 69-4 thus permitting, upon receipt of plural requests therefrom, a request from the unit with higher priority to output first.

Figure 12:
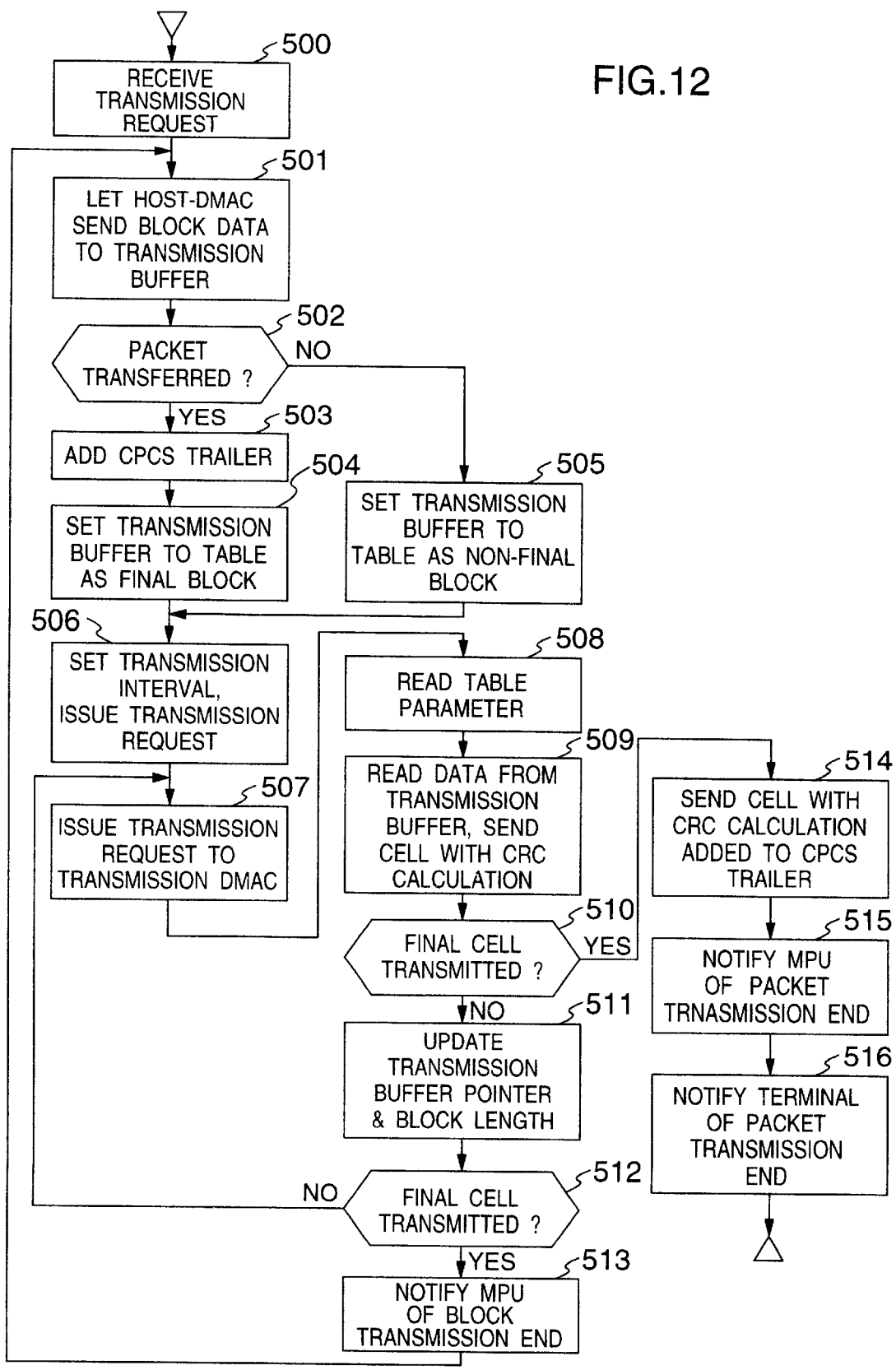
FIG. 12 is a flow diagram showing a procedure of data transmission of the ATM communication control device.

A data transmit operation of the ATM communication control device 2 thus configured is as follows. See FIG. 12. Data transmit control procedure of device 2 begins with step 500 whereat the MPU 100 of FIG. 1 receives a packet transmit request from one of the terminals 1 of FIG. 2 via the common memory 80. At step 501, the MPU 100 renders the HOST-DMAC 50 operative causing a data block of a transmit data packet as presently stored in the main memory 5 to be sent to TX buffer 46. Then, at step 502, MPU 100 attempts to determine whether all the data blocks of transmit packets have been transferred. If "YES" at step 502, that is, when transmission of all the data blocks was completed, then the control procedure goes to step 503 which adds to the transfer-completed transmit packet the CPCS trailer of FIG. 4 other than the CRC-32 field 143-3 shown in FIG. 4. The procedure goes next to step 504 which sets to a corresponding VC segmentation management table 45 the top address of transmit buffer 46 and transmit data length as well as a template of cell header to be added to the transmit cell plus the information designating the finality of cell block. If "NO" at step 502, i.e. when the intended DMA transfer is not yet completed, then the procedure goes to step 505, which registers certain information designating non-finality of block to its corresponding VC segmentation management table 45.

Then, the control procedure goes to step 506, which permits the MPU 100 to register at the rate timer 69 a corresponding VC connection identifier and its associative transmit time interval. After the registration is done, the procedure goes next to step 507 which lets rate timer 69 derive at its output a cell transmit request to the TxDMAC 61 every time when the designated transmit interval has elapsed. Upon receipt of such transmit request, TxDMAC 61 in turn accesses a corresponding VC segmentation management table 45 to read therefrom the transmit buffer pointer 45-1 (FIG. 8), transmit data length 45-2, currently available transmit CRC calculation result 45-3 (initial value is zero), and transmit cell header 45-5, respectively. Then, the procedure proceeds to step 509 for reading the transmit data of transmit buffer 46 with 48 byte data being as a unit, which may be combined together with the prior-read cell header 45-4 (FIG. 8) into a cell for transmission. When this is done, let the payload section undergo CRC calculation. Next, the procedure enters step 510 to determine if the final cell of such transmit packet has been received after completion of cell transmission.

If NO at decision step 510, i.e. if the final cell of transmit packet is not yet transmitted then the routine goes to step 511 which causes the TxDMAC 61 to move or "duplicate" the CRC calculation result to the segmentation management table (FIG. 8) for saving therein, while updating the transmit buffer pointer 45-1 and transmit data length 45-2 to get ready to wait for the next cell transmission. The procedure goes next to step 512 which determines whether the final cell of transmit buffer 46 has been sent forth. If NO at step 512 then return to step 507. If YES at step 512 then proceed to step 513 for notifying MPU 100 of completion of the data block transmission. Thereafter, the procedure gets back to step 501.

If at step 510 the final cell of transmit packet has been sent already, then the procedure goes to step 514 which permits TxDMAC 61 to insert the CRC calculation result at such time into the CRC-32 field 143-3 of CPCS trailer of FIG. 4, which is then sent forth toward PHY controller 9. After delivery of the calculation result, the procedure goes next to step 515 which notifies MPU 100 of completion of packet transmission. At step 516, MPU 100 is responsive to receipt of such notice for notifying terminal 1 that its intended packet data transmission has been completed.

A data receive operation of the ATM communication control device 2 is as follows. See FIGS. 13–14. At step 600 of FIG. 13, the cell TX/RX control unit 70 of ATM controller 8 shown in FIG. 1 receives a cell or cells from the PHY controller 9. Then, at step 601, the cell segmentation processor 75 of FIG. 9 operates to analyze the cell header of each cell received to thereby identify the cell type 78-9 (FIG. 9) while at the same time converting the VPI/VCI of such cell to the VC identifier by use of the VC identification CAM 77. Next, the routine goes to step 602 which permits cell TX/RX controller 70 to designate the cell type 78-2 and VC identifier 78-1 (FIG. 9) so that RxDMAC 62 of FIG. 10 is rendered operative. After startup of RxDMAC 62 the routine proceeds to step 603 for letting RxDAMC 62 be responsive to cell type 78-2 for attempting to determine whether the cell type is a data cell.

In the event that the cell received is not any data cell 245 of FIG. 5A, then decision block 603 causes a branch to step 604 which passes such cell to the management cell RX buffer 49A of FIG. 8. The routine goes next to step 605 for notifying the MPU 100 of receipt of a management cell. Upon receipt of this notice, MPU 100 executes appropriate processing in conformity with the content of the management cell at step 606, and then at step 607 determines if a response is required. If YES at decision step 607, that is, if the response is requested, then at step 608 MPU 100 generates and issues a management cell for reply, which is then stored in the management cell TX buffer 49B of FIG. 8 while simultaneously rendering TxDMAC 61 operative to start transmission of such management cell created.

If YES at step 603, i.e. when the cell received is a data cell 245 of FIG. 5A, then the routine goes to step 609 which accesses the reassembly management table 47 of FIG. 8 that may correspond to the VC thus identified to thereby read a parameter out of it. Then, proceed to step 610 for determining whether RX buffer 48 is available in the receive buffer pointer 47-1 of FIG. 8. If NO at step 610, that is when such receive buffer 48 is absent, i.e. has not been registered yet, in the pointer 47-1 then go to step 611 which extracts from the receive buffer table 65 of FIG. 10 the top address of empty or "idle" receive buffer for registering it to the receive buffer pointer 47-1 of reassembly management table 47.

Figure 13:
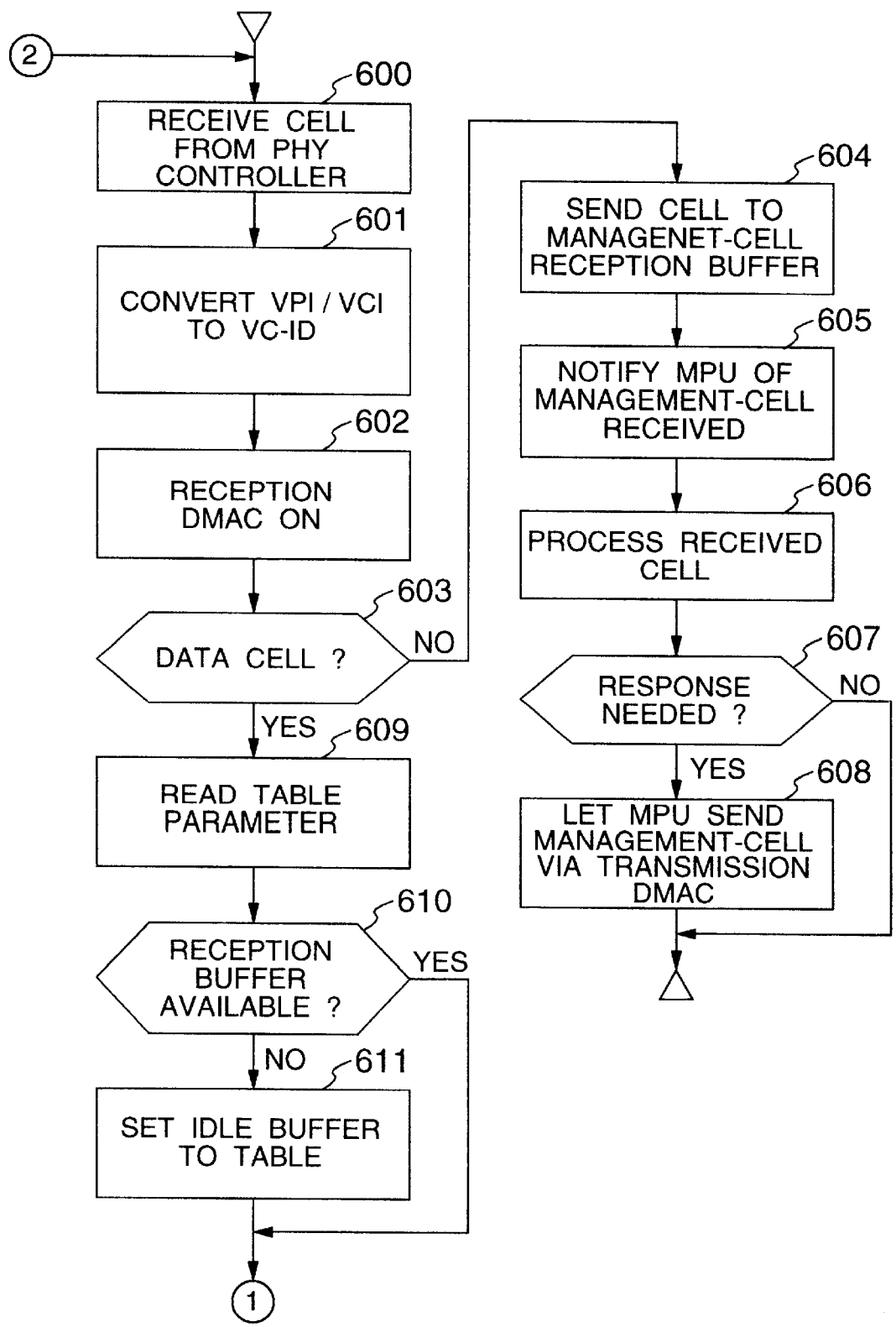
FIGS. 13 and 14 are a flowchart of a data receive procedure of the ATM communication control device.
Figure 14:
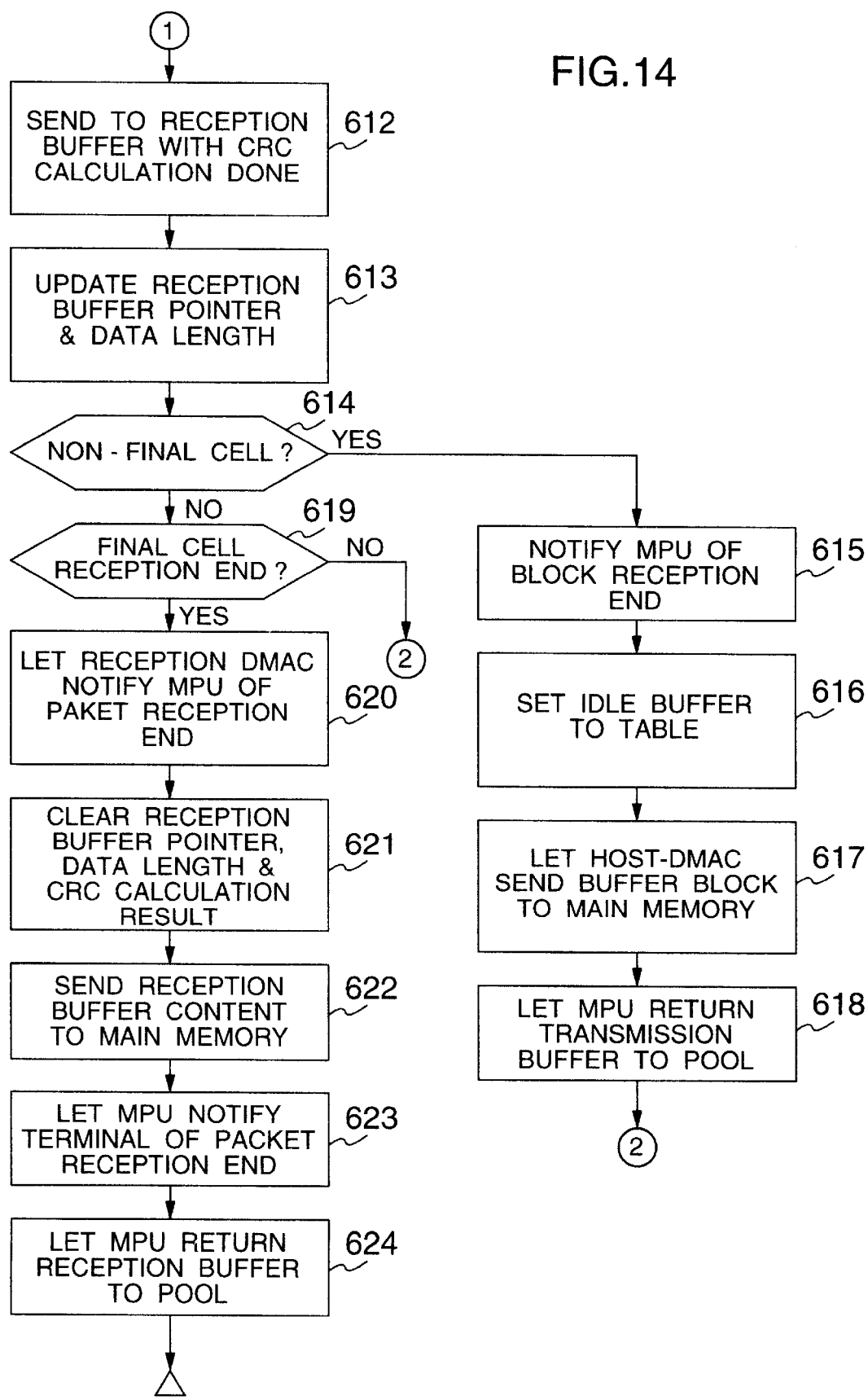

Thereafter, the routine goes to step 612 shown in FIG. 14. It is noted that if YES at step 610 of FIG. 13 then the routine skips or bypasses step 611 to enter step 612 directly. In step 612, transfer the payload part of the received cell while executing CRC calculations with respect to a receive buffer 48 as presently pointed out by the receive buffer pointer 47-1. After completion of such data transfer, the routine goes next to step 613 which permits RxDMAC 62 of FIG. 10 to move and save the CRC calculation result into the receive CRC calculation result storage 47-3 of reassembly management table 47 while simultaneously updating both the receive buffer pointer 47-1 and receive data length 47-2 to get ready to receive the next cell(s). Then, go to step 614 for determining whether the receive buffer 48 at the destination terminal is full of received packet non-final cells.

If YES at decision step 614 in FIG. 14, namely when the receive buffer 48 of FIG. 8 is filled with non-final cells, then the control routine goes to step 615. In step 615 RxDMAC 62 of FIG. 10 notifies MPU 100 of both data block receive completion and its top address; then, at step 616, acquire from the receive buffer pool 65 the address of any idle RX buffer, which is then registered to the reassembly management table 47. Upon receipt of such notice, MPU 100 causes HOST-DMAC 50 of FIG. 1 to become operative sending the data block to the main memory 5 at step 617. Then, the routine goes to step 618 for again registering or "reregistering" such address to RX buffer pool 65 in order to let the RX buffer be free or "idle" in the source terminal 1. Thereafter, the routine may return to cell-receive step 600 shown in FIG. 13.

If NO at step 614 of FIG. 14, i.e., if the RX buffer 48 is not full of non-final cells and still has room therefor, then the routine goes to step 619 which permits RxDMAC 62 to determine whether the cell received is the final cell of a presently received packet. If NO at step 619 then the routine get back to step 600 of FIG. 13. If YES at step 619 then proceed to step 620 which makes use of the current CRC calculation result to verify or check for the normality or regularity to thereby notify MPU 100 of both the address of RX buffer 48 and receive data length, as the packet receive completion information. Thereafter, the routine goes to step 621 for clear or reset the contents of respective fields of the RX buffer pointer 47-1, receive data length 47-2, and current receive CRC calculation result 47-3. Upon receiving of such receive packet completion notice, MPU 100 renders HOST-DMAC 50 operative sending to main memory 5 the final data block of receive packet at step 622; then, at step 623, MPU 100 notifies the terminal 1 of completion of the packet reception via common memory 80. Next, at step 624, MPU 100 reregisters such address to RX buffer pool 65 in order to let the RX buffer of the source terminal be free or idle.

Figure 15:
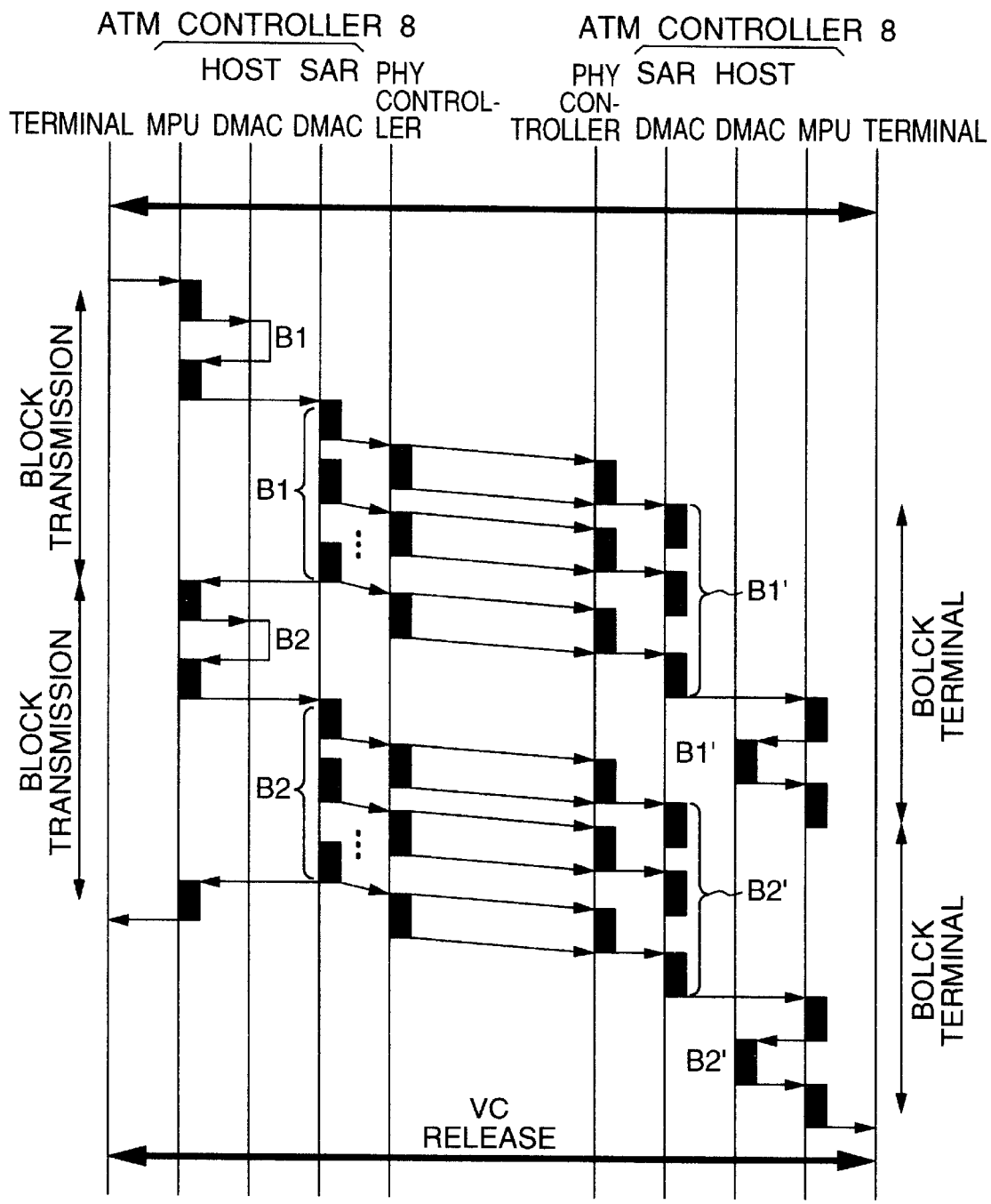
FIG. 15 is a timing diagram showing one exemplary operation of the ATM communication control device.

Turning now to FIG. 15, one exemplary operation of the ATM communication control device 2 is shown which may be attainable by the control procedure routines stated in conjunction with FIGS. 13–14. In FIG. 15 the reference characters "B1" and "B2" designate processing with respect to certain data blocks different from each other. It is noted that while this depiction is drawn to one-way or unidirectional communications for purposes of brevity and clarity of exposition only, the system employing the principles of the invention may practically be implementable in bidirectional communications networks. As shown in FIG. 15, the HOST-DMAC 50 of ATM controller 2 is operable to carry out transmission of packet data with each data block being as a unit therefor and also to repeat such transmission tasks every time a single data block undergoes transmit/receive event. This may permit the buffer memory 40 to decrease in storage capacity to the extent that the buffer memory capacity required is as less as a minimal capacity capable of storing one data block per ATM connection.

Figure 16:
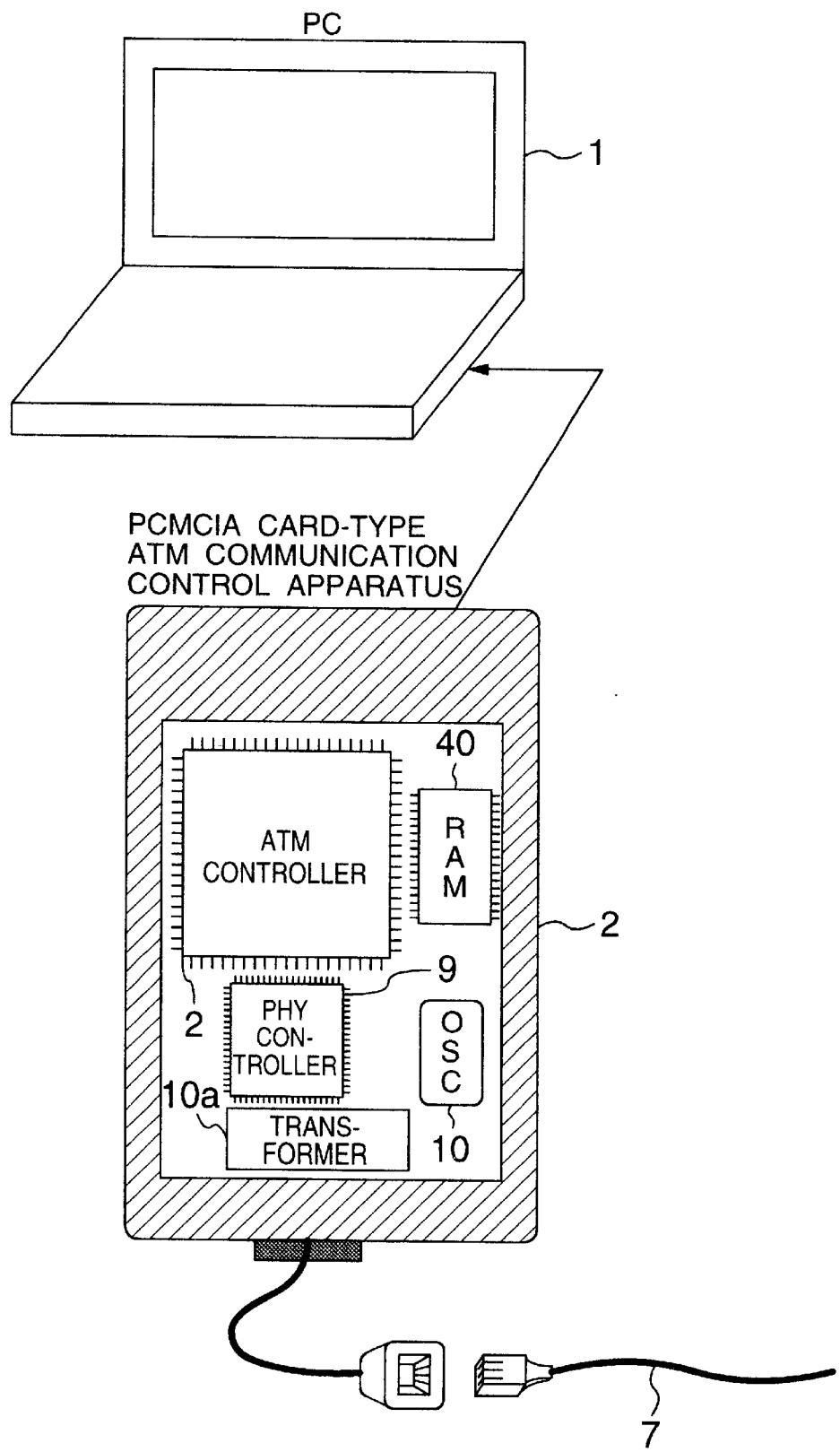
FIG. 16 shows a plan view of the parts-mount surface of an ATM communication control device of the card type which accommodates the personal computer memory card international association (PCMCIA) standards, along with a pictorial representation of a notebook-type personal computer associated therewith.

One typical form of reducing to practice the ATM communication control device 2 embodying the invention is shown in FIG. 16. As shown, a portable or small-size personal computer 1 of the notebook type has a PC card expansion slot with a PCMCIA card module being installed therein. This card module includes ATM control device 2 having a printed circuit board or tape-automated bonding (TAB) substrate, on which a one-chip large-scale integrated circuit (LSI) chip package 8 is mounted with the ATM communication control functions implemented therein. The ATM controller LSI 8 is operatively associated with a prior known one-chip PHY controller 9, a RAM 40 acting as the buffer memory, quartz crystal oscillator IC 10, and transformer IC 10a for communication line connection, all of which are mounted together on the PCMCIA card substrate. The illustrative ATM controller card module 2 has a network cable lock port which is linkable with the connector of a data link cable 7, which is in turn connected to a mobile radio-telephone handset unit (not shown), by way of example.

As apparent from the foregoing description, the ATM controller 8 is capable of employing as its required buffer memory 40 a small-capacity memory 40 of low cost penalty. Another advantage of this embodiment lies in the ability to attain a superior ATM controller 8 low in production cost and power dissipation due to a decrease in amount of the processing tasks to be executed by the MPU 100 per se because of the fact that the ATM protocol processing as inherently loaded on MPU 100 is limited to those processing tasks with flexibility for altering processing content while causing the remaining tasks to be handed by a separate, hard wired logic circuitry as operatively associated therewith. A still another advantage of the illustrative approach to attaining the ATM controller 8 by use of a one-chip LSI is that ATM communication control device 2 decreases in number of its constituent parts or components required, which may in turn enable ATM control device 2 to be implemented in extra-small devices such as for example PCMCIA card modules for use with hand-carryable notebook PCs.

Figure 17:
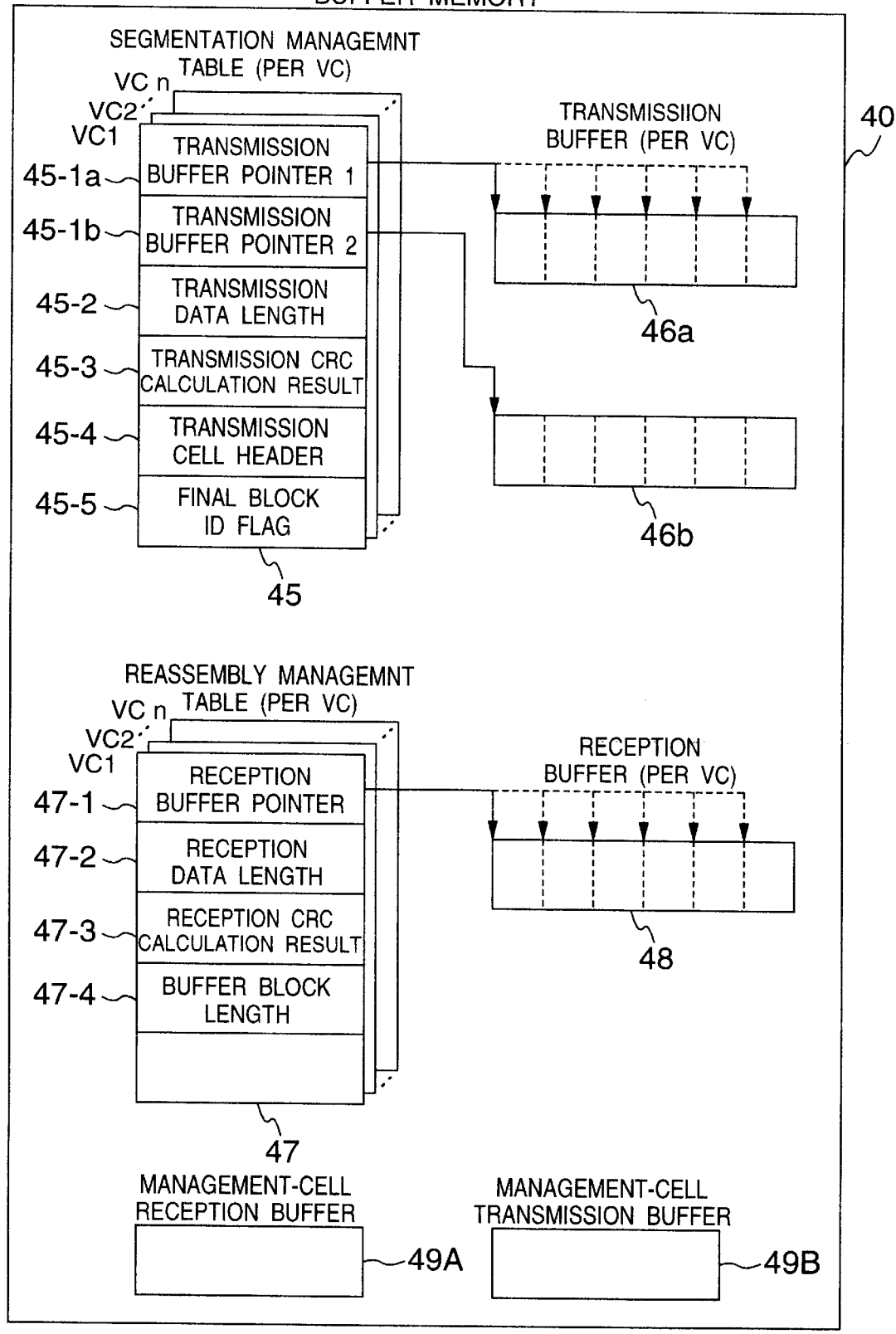
FIG. 17 is a pictorial representation of a table configuration as defined in a buffer memory of an ATM communication device in accordance with a second embodiment of the invention.

An ATM communication control device in accordance with a second embodiment of the invention is shown in FIG. 17, having its buffer memory 40 which is similar to the first embodiment stated supra with the scheme of controlling transmission of the data block 145 of FIG. 4 being so modified as to further suppress or minimize any possible delay in cellular communication due to delivery of data block 145. Any explanations as to the same configuration and operation will be eliminated herein for purposes of simplicity of description only.

As shown in FIG. 17, the buffer memory 40 of the ATM communication device has a segmentation management table 45. The table 45 may be similar to that shown in FIG. 8 with the transmit (TX) buffer pointer 45-1 of FIG. 8 being replaced with a pair of TX buffer pointers 45-1a and 45-1b. These pointers 45-1a, 45-1b are interconnected to two separate TX buffers 46a, 46b, respectively. Use of such two TX buffer pointers 45-1a, 45-1b makes it possible to permit simultaneous registration of two TX buffers 46a, 46b per VC at a time.

Figure 18:
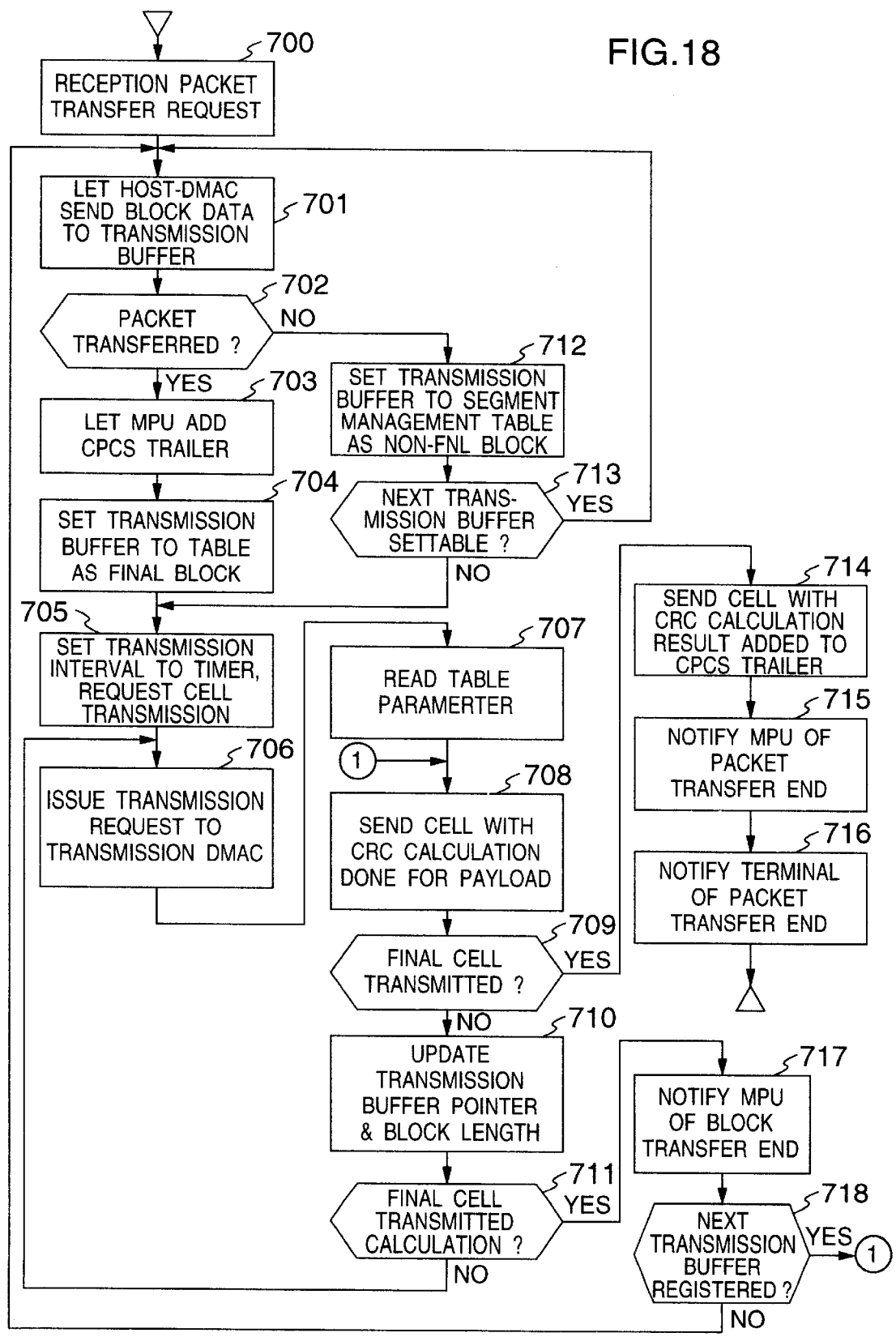
FIG. 18 is a flowchart of a data receive procedure of the ATM communication control device of FIG. 17.

An operation of the ATM communication control device 2 with its buffer memory 40 shown in FIG. 17 is as follows. See FIG. 18, which illustrates a data transmit control procedure thereof. This procedure begins with step 700 which receives a packet transmit request from a terminal 1 with ATM control device 2 installed therein. The procedure then goes to step 701 which causes HOST-DMAC 50 to get started then transferring to a corresponding TX buffer 48 a single block data that may be one of non-final data items of a transmit packet concerned. The procedure goes next to step 702 for determining whether transfer of one data packet is completed. If No at step 702 then perform registration of the segmentation management table 45 of a corresponding VC at step 712. At step 713, the MPU 100 attempts to determine if it is possible to register the RX buffer 48 for storage of the next data block. If YES at step 713 then return to step 701; alternatively, if NO then execute DMA transmission of the next data block.

If YES at step 702, i.e. when the transfer of one packet has been completed, then go to step 703 which permits MPU 100 to add a CPCS trailer other than CRC. Next, at step 704, register the TX buffer to the segmentation management table as a final block. Next, at step 705, set an appropriate cell transmit time interval to the rate timer 69, then issue a cell transmit request. At step 706, let the rate timer derive the cell transmit request to TxDMAC 61 every time a presently designated time elapsed. AT step 707 the TxDMAC operates to read necessary parameters out of the segmentation management table. After reading, go to step 708 to read 48-byte data out of the TX buffer for cell creation and transmission based on the current registration content while simultaneously executing the required CRC calculations with respect to the payload part thereof. Then, proceed to step 709 for determining whether the final cell transmission is completed.

If YES at step 709, then branch to step 714 which adds the CRC calculation result to the CPCS trailer for outward cell delivery. Then, enter step 715 for notifying MPU 100 of completion of the packet transmission required. At step 716, the MPU notifies the terminal 1 of completion of its required packet transmission.

If NO at step 709 then proceed to step 710, which moves for save the currently available CRC calculation result to the segmentation management table while updating the contents of each TX buffer pointer and TX block length. The procedure goes next to step 711 for determining whether the final cell transmission of the buffer concerned is completed. If NO then return to step 706. If YES then go to step 717 which notifies MPU 100 of completion of the block transmission required. Then, proceed to step 718 to determine if the next transmit buffer is registered already, which buffer may be for storage of a data block to be next transferred. If NO at step 718 then get back to step 701 which attempts to get or acquire new block data. If YES then go to step 708, which refers to such registration to generate and issue a cell or cells for transmission based on the registration content.

Figure 19:
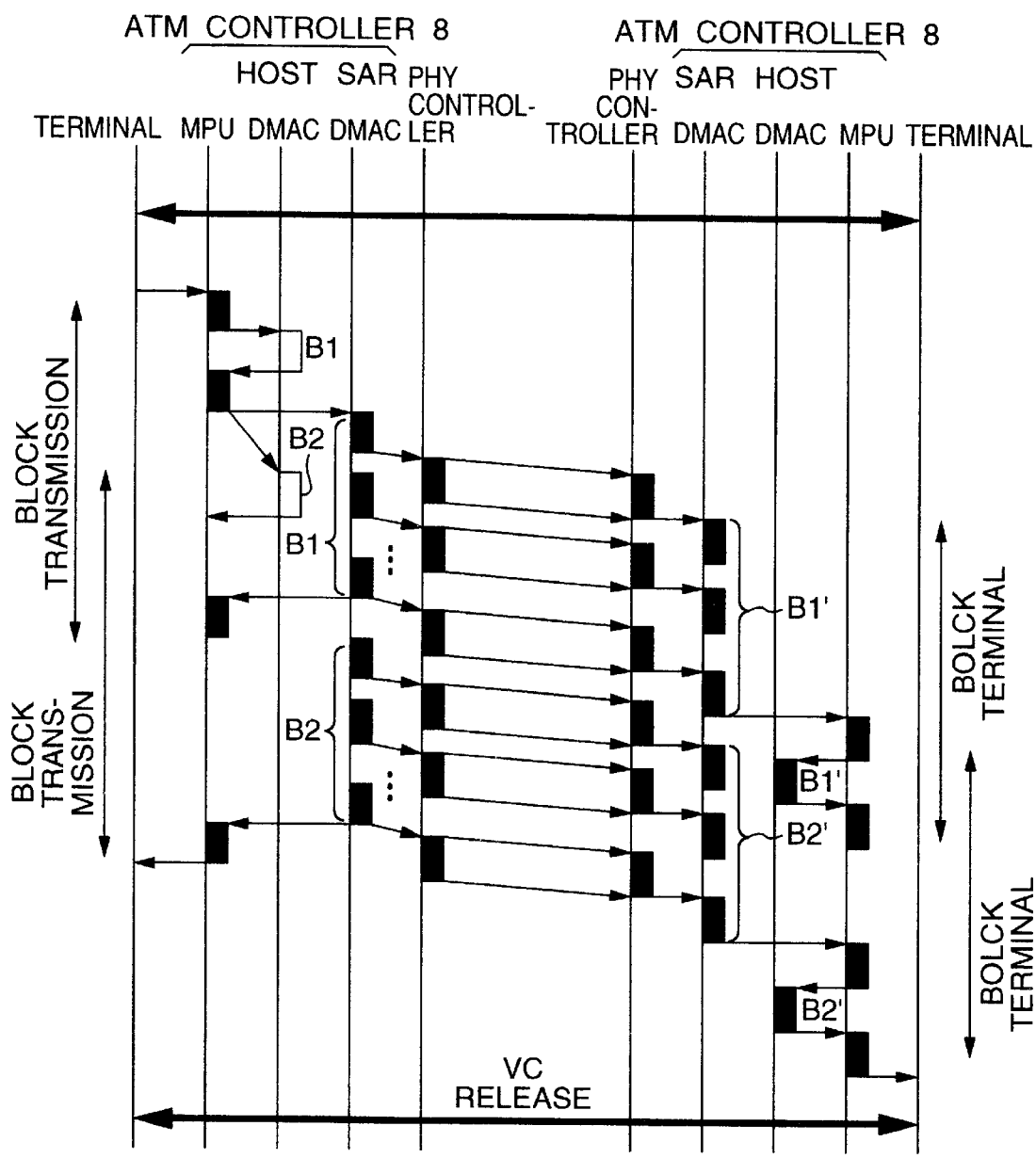
FIG. 19 is a timing chart showing an exemplary operation of the ATM communication device of FIG. 17.

One typical transmit/receive operation of the ATM communication control device 2 is shown in FIG. 19. It would be readily understandable to those skilled in the art by comparing FIG. 19 to FIG. 15 that this embodiment with its "twin TX pointer" buffer memory 40 shown in FIG. 17 is arranged to transfer multiple data blocks at a time in a parallel way; more specifically, while a certain data block is being transferred to the terminal 1, another data block, typically, a data block to be next subject to transmission or alternatively a data block immediately prior to the last one with its receive processing completed already, may simultaneously be delivered thereto in a parallel fashion. This makes it possible to continuously transmit or receive all the cells in a transmit packet in a "seamless" way without having to receive any unwanted affection from transfer attempts between terminals, which may in turn enable further enhancement of the efficiency of cellular communications.

Figure 20:
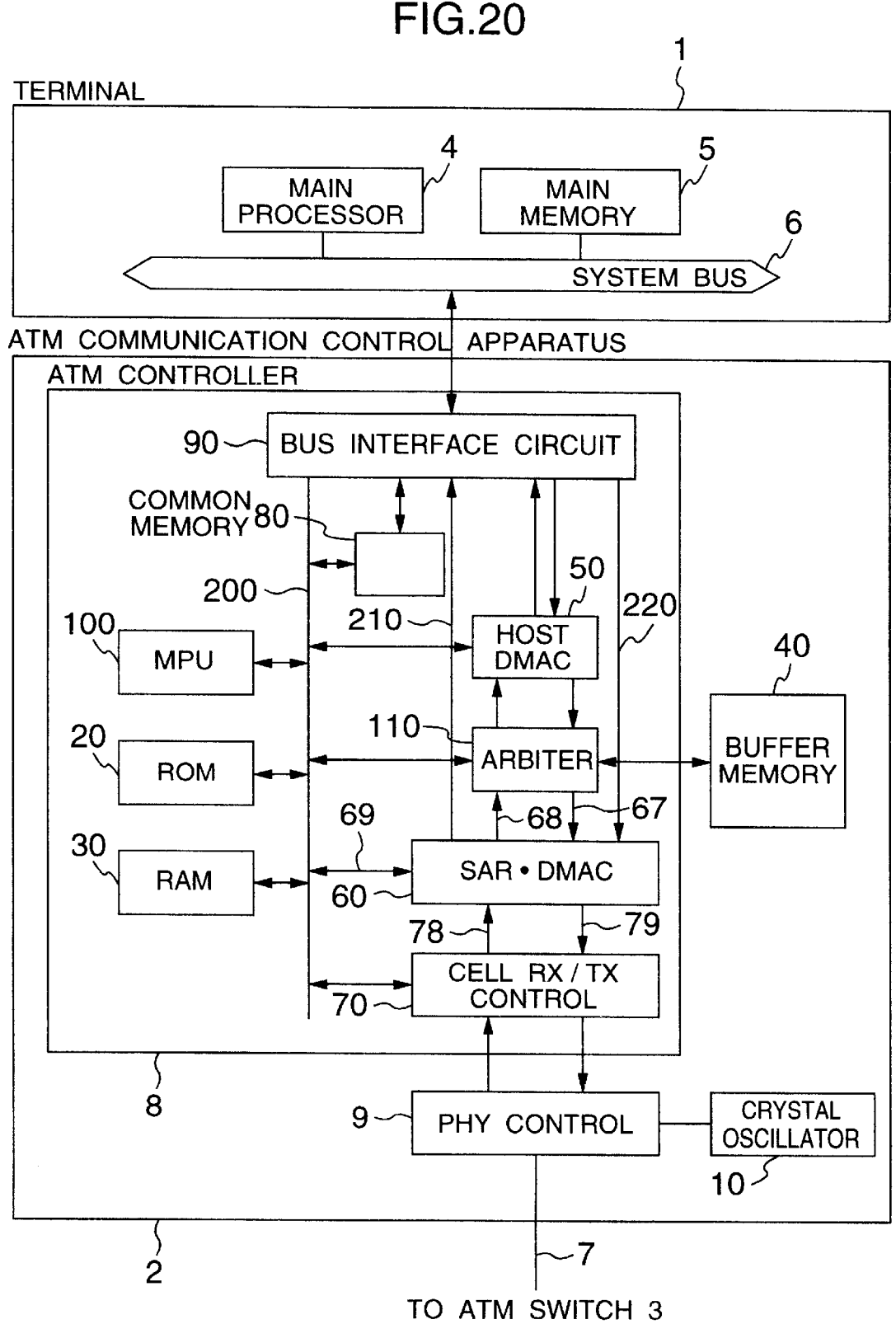
FIG. 20 is a block diagram showing a configuration of an ATM communication device in accordance with a third embodiment of the invention.

An ATM communication control device in accordance with a third embodiment of the instant invention is shown in FIG. 20, which is similar to that shown in FIG. 1 with extra data transfer buses 210, 220 being added between the bus interface circuit 90 and SAR/DMAC 60, thereby to enable the intended cell segmentation and/or reassembly processing to be effectuated by not only the buffer memory 40 but also the main memory 5 of terminal 1. With such an "additional accessibility" feature, the SAR/DMAC 60 is now permitted to transmit and receive data cells to and from the terminal main memory 5 via DMA buses 210 and 220 as well as bus interface 90, while also offering switchability for the individual ones of VCs. It is noted that the buffer memory 40 may be incorporated in the ATM controller 8 instead of placing it in the ATM communication control device 2.

Figure 21:
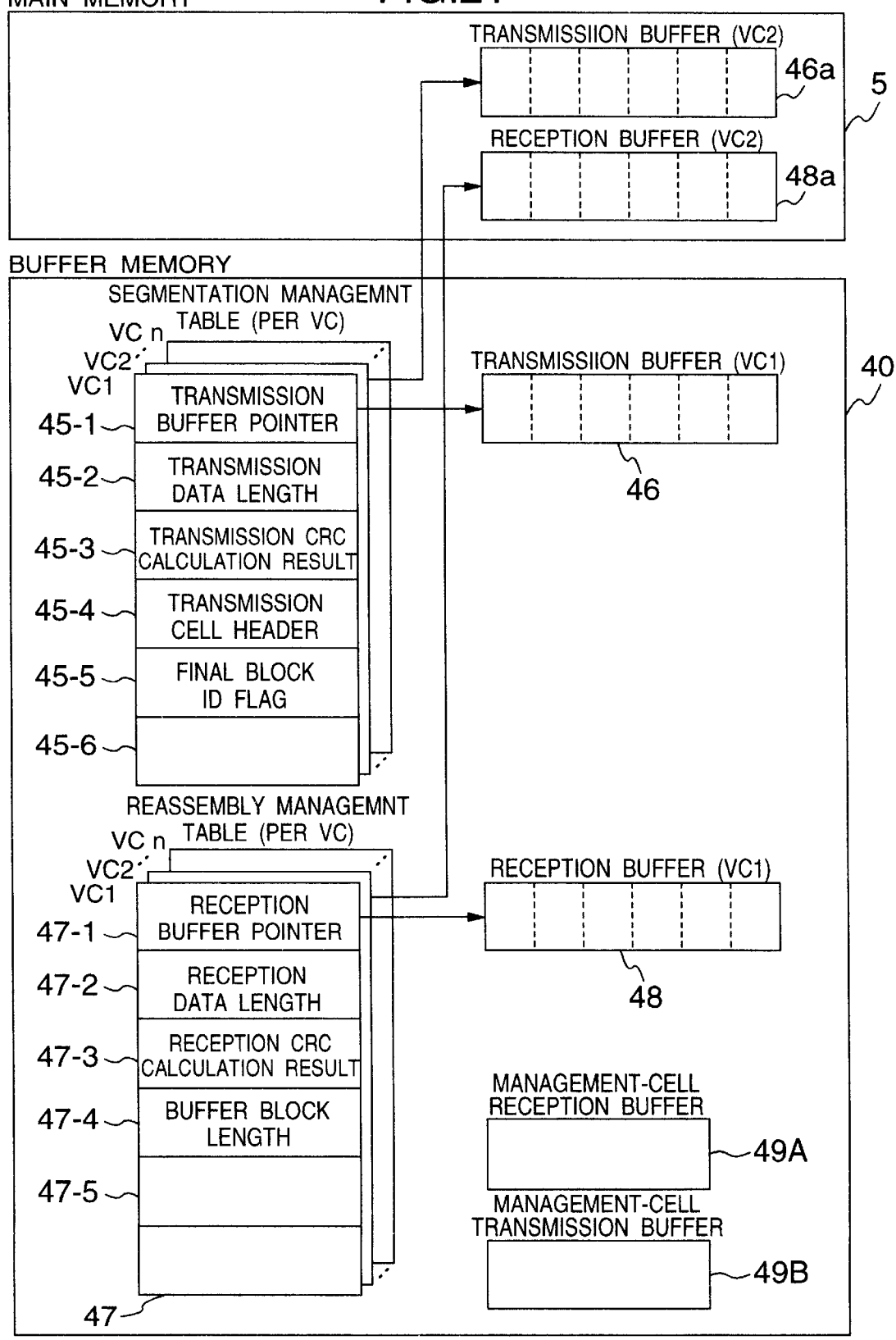
FIG. 21 is a diagram depicting a configuration of a table as defined in a buffer memory of the device of FIG. 20.

The ATM communication control device 2 of FIG. 20 includes a buffer memory module 40 shown in FIG. 21. As shown, the buffer pointer 45-1 as defined for each of VC1, VC2, . . . , VCn in the segmentation management table 45 is operatively coupled to a TX buffer 46a built in the terminal main memory 5 in addition to TX buffer 46 in memory 40. This may enable them to indicate the contents of main memory 5 along with those of TX buffer 46. Segmentation management table 45 is also added with a transmit buffer type identification field 45-5 which indicates that a data packet as presently transferred is stored in which one of the "self" TX buffer 46 and the "external" TX buffer 46a in main memory 5.

The same principle may also be applicable to the reassembly management table 47 in buffer memory 40 of FIG. 21. More specifically, the RX buffer pointer 47-1 of each VCi table 47 (where "i" is 1, 2, 3, . . . , n) is operatively coupled to both the "self" RX buffer 48 within buffer memory 40 and also to the "external" RX buffer 48a as provided in terminal main memory 5. This enables alternate or selective designation of one of the two buffer contents as needed. Reassembly management table 47 comes with an RX buffer type identification field 47-5 as added thereto for correct indication of which one of the self and external RX buffers 48, 48a undergoes storage of cells as presently received.

The ATM communication controller 2 of FIG. 20 includes its built-in SAR/DMAC 60 which may be configured as shown in FIG. 22. SAR/DMAC 60 shown herein may be similar to that of FIG. 10 with the rate timer 69 of FIG. 10 being deleted and with a host receive buffer pool 66 being additionally connected to RxDMAC 62. The buffer pool 66 is for storing therein an address or addresses of any empty or "idle" regions of the external RX buffer 48a as defined in terminal main memory 5.

An operation of the embodiment of FIGS. 20–22 with the host RX buffer pool-added configuration is generally similar to that of the first embodiment in sending and receiving data to and from any one of the terminals 1 with each data block 145 used as a unit except that specific functions are associated therewith as will be described below.

See FIG. 23, which depicts the flow of one typical procedure of such "special", functions concerning the selectivity of RX buffers 48, 48a as offered by ATM control device 2 of FIGS. 20–23. As shown, the RX buffer select procedure gets started at step 450 which permits, upon startup of a data communication, the MPU 100 to set up an appropriate ATM connection (VC). The procedure then goes to step 451, which attempts to determine whether the resultant ATM connection is the one that requires a specific type of cellular transmission of low delay, i.e., high-speed cell transmission. If YES at step 451, that is, when the connection requires high-speed transfer, then proceed to step 452 for setup of a flag indicative of use of the terminal main memory 5, say, "main memory" flag, in the RX buffer type ID field 47-4 of reassembly management table 47. After the flag registration, go to step 453 which registers an address of "external" RX buffer 48a as presently defined in main memory 5 to the host receive buffer pool 66 within SAR/DMAC 60 shown in FIG. 22.

If NO at step 451, namely if the setup ATM connection does not specifically require such high-speed cellular transmittability, then branch to step 454 which sets a "buffer memory" flag in the RX buffer type ID field 47-4 in the reassembly management table 47 of FIG. 21. Next go to step 455 for registering an address of "self" RX buffer 48 as defined in buffer memory 40 to the host receive buffer pool 65 within SAR/DMAC 60 of FIG. 22. The self and external TX buffers 46, 46a may be designed to execute selection and registering tasks in substantially the same procedure under the same criteria or conditions as those stated supra.

A data cell receive operation of the RxDMAC 62 of FIG. 22 is as follows. See FIG. 24 which shows one typical control routine as implementable therein. The routine begins with step 460. At this step RxDMAC 62 receives one or several data cells. Then, the routine goes to step 461 for accessing the reassembly management table 47 of one corresponding VCi (i=1, 2, . . . , n) to read its stored parameter therefrom. Then, at step 462, verify whether the RX buffer ID field 47-4 is with "main memory" flag as set therein. If YES at step 462, go to second decision step 463 which determines whether no RX buffers are registered at RX buffer pointer 47-1. If YES at step 463, namely when no RX buffers are registered at RX buffer pointer 47-1, then go to step 464 for acquiring the address of an idle RX buffer from the host RX buffer pool 66 of FIG. 22, which is registered to the RX buffer pointer 47-1. Next, in step 465, transfer the received cell or cells to RX buffer 48a of main memory 5 which is designated by such RX buffer pointer 47-1. If NO at step 463 then skip step 464 to directly go to step 465. After such cell transfer, proceed to step 469 to update the contents of the reassembly management table.

Figure 24:
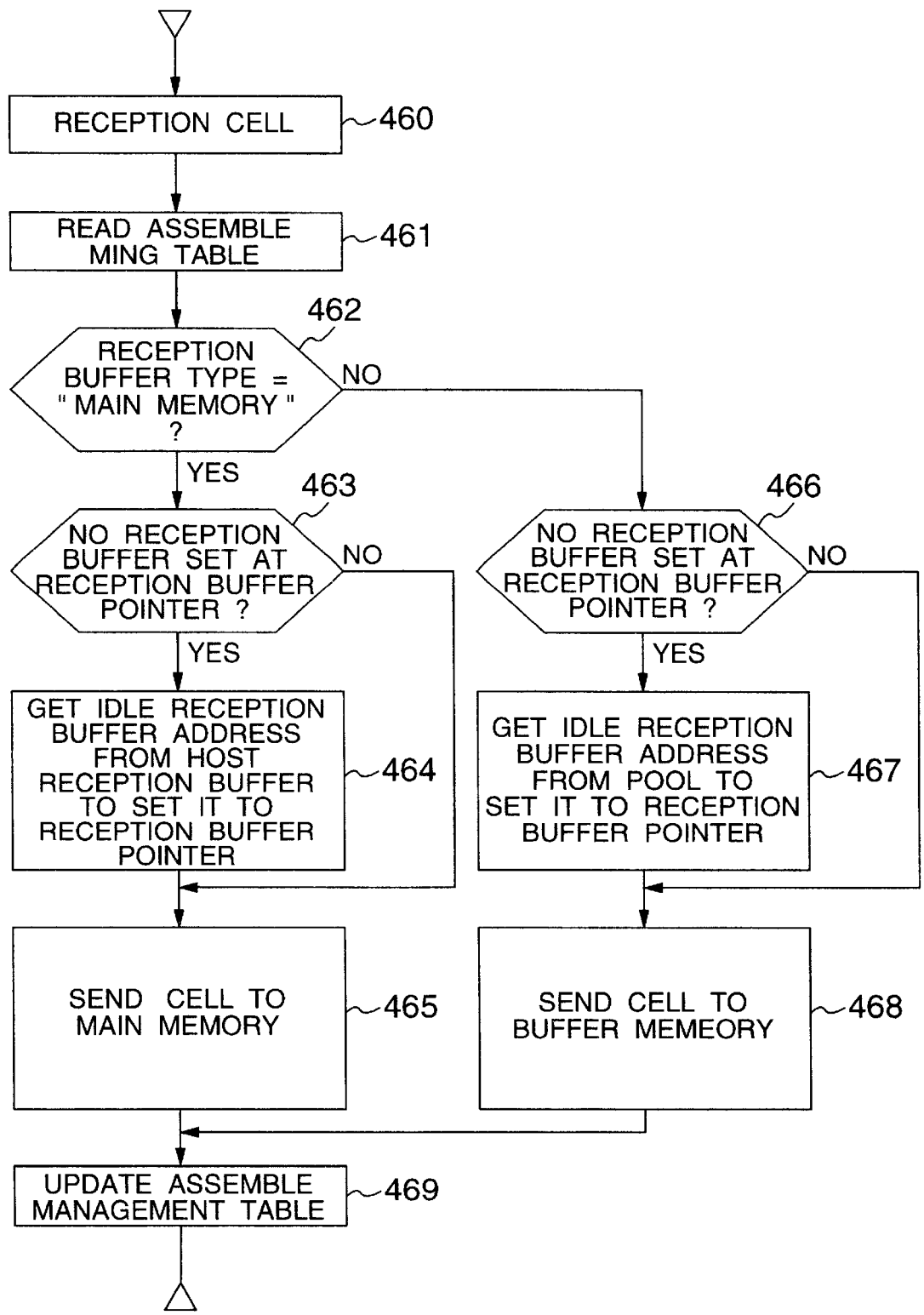
FIG. 24 is a flowchart of cell transfer processing executed by an ATM controller.

If NO at first decision step 462 of FIG. 24, i.e. when the field 47-4 is set with the "buffer memory" flag, then the routine branch to step 466 which attempts to determine whether no receive RX buffers are registered at RX buffer pointer 47-1. If YES at step 466 then go to step 467 for acquiring the address of an idle RX buffer from RX buffer pool 66 of FIG. 22 to register it to RX buffer pointer 47-1. Skip this step 467 if NO at step 466. Next, enter step 468 for passing the received cell(s) to the RX buffer 48 of buffer memory 40 as identified by such RX buffer pointer 47-1; thereafter, proceed to step 469 stated previously. Even during cellular transmit processing also, selecting one from TX buffers 46, 46a will be carried out in a way similar to that described above.

It should be noted that the bus interface circuit 90 of ATM controller 8 in FIG. 20 is arranged to perform data transfer processing with respect to the SAR/DMAC 60 of FIG. 22 with its task execution priority being kept higher than that to the DMA transfer processing with respect to HOST-DMAC 50. More specifically, assume that as shown in FIG. 25, a transfer request is received from SAR/DMAC 60 at a "midway" instant within the time duration devoted to processing of the DMA transfer of HOST-DMAC 50 (FIG. 20). If this is the case, the bus interface circuit 90 interrupts or "freezes" the presently executed DMA transfer processing of HOST-DMAC 50 and then initiates the transfer processing of SAR/DMAC 60. With such a "selective priority-based transfer execution" feature, it becomes possible to shorten a time as required to transfer cells between SAR/DMAC 60 and terminal main memory 5.

As apparent from the foregoing description, one significant advantage of the ATM communication control device 2 embodying the invention shown in FIG. 20 is that low-speed/low-capacity memory devices of reduced cost penalty are employable for the buffer memory 40. This can be said because selected cell segmentation/reassembly processing is specifically effectuated using part of the storage regions of terminal main memory 5 with respect to those VCs with increased affectability leading to occurrence of any possible delay in data transmission. Another advantage lies in the capability to further increase the cellular transmission rate while permitting further reduction of the processing load of MPU 100 with regard to those processing tasks relating to such cell transmission.

It must be noted that while in the prescribed illustrative embodiments either one of the terminal main memory 5 and buffer memory 40 is to be selected as a destination location per virtual channel VCi in conformity with the nature of traffic to be handled, other rules or schemes may alternatively be employable. One example is that the transfer destination may be switchable depending on the actual amount of traffic without regard to the nature of traffic and also irrespective of how the segment of virtual circuits is designed for implementation. Still alternatively, the selection may be done in a way that corresponds to the category of cells concerned, such as for example depending on whether a cell of interest is a data cell of control system or a data cell for use with end users. Note also that the ATM communication control device 2 may be modifiable to include therein two separate TX buffer pointers 45-1 in its buffer memory 40 while performing the data block transfer control operation in substantially the same way as in the second embodiment, which in turn enables the cellular communication to further increase in performance and in efficiency as well as in reliability.

Although the invention has been disclosed and illustrated with reference to some particular embodiments, the principles involved are susceptible for use in numerous other embodiments which will be apparent to persons skilled in the art. The invention is, therefore, to be limited only as indicated by the scope of the appended claims.

What is claimed is:

1. An asynchronous transfer mode ("ATM") controller adapted to be connected between an ATM network data transfer path and a terminal unit for performing processing of an ATM layer and an ATM Adaptation Layer of a selected ATM protocol, said ATM controller comprising:

a transfer circuit, connected with a buffer memory which stores packet data with at least one de-assembled predetermined length data block, for transferring the packet data according to the extent of the predetermined length data block between said buffer memory and a memory in said terminal;

a cell transmit control circuit de-assembling the predetermined length data block sent from the terminal memory to said buffer memory into data cells, for transmitting the data cells to the ATM network;

a cell receive control circuit re-assembling the data cells received from said ATM network over said transfer path into at least one predetermined length data block in said buffer memory; and a transfer control circuit for instructing said transfer circuit to transfer said predetermined length data block between said buffer memory and said terminal memory and for instructing said cell transmit control circuitry and said cell receive control circuit to transfer said data cells between said buffer memory and said ATM network via said transfer path.

2. An ATM controller set forth in claim 1 wherein said transfer control circuit assembles said data cells received from said ATM network and receives a receive notice indicating that the predetermined length data block was found on the buffer memory and then permits transmission of said predetermined length data block formed in said buffer memory toward said terminal memory.

3. An ATM controller set forth in claim 1 wherein said transfer control circuit instructs said cell transmit control circuit to send toward said ATM network said data cells divided from said predetermined length data block and stored in said buffer memory.

4. An ATM controller set forth in claim 1 further comprising:

a cell type identifier circuit responsive to receipt of a cell from said ATM network for analyzing a header part thereof in determining whether the cell is a data cell;

rewritable program memory for storing a control program for use in processing cells other than said data cells; and a microprocessor for executing a processing of those cells other than the data cells identified by said cell type identifier circuit.

5. An ATM controller as set forth in claim 1, wherein said buffer memory has storage regions for a plurality of predetermined length data blocks per ATM connection or virtual channel.

6. An ATM controller set forth in claim 1 wherein said transfer control circuit instructs said transfer circuit and said cell transmit control circuit to execute a transfer of said predetermined length data block between said terminal memory and said buffer memory via said transfer circuit while transferring a data cell between said buffer memory and said ATM network through said cell transmit control circuit in parallel.

7. An ATM controller set forth in claim 1 wherein said transfer circuit said cell transmit control circuit, said cell receive control circuit and said transfer control circuit are incorporated in a large scale integrated circuit (LSI).

8. An ATM controller set forth in claim 1 wherein said transfer circuit, said cell transmit control circuit, said cell receive control circuit, said transfer control circuit and said buffer memory are incorporated in a large scale integrated circuit (LSI).

9. An ATM controller connected between an ATM network data transmission path and a terminal for performing processing of an ATM layer and an ATM Adaptation Layer of an ATM protocol used, said controller comprising:

a transfer circuit, connected with a buffer memory which stores packet data with at least one de-assembled predetermined length data block, for transferring the data packet according to the extent of the predetermined length data block between said buffer memory and a memory in said terminal;

a cell transmit control circuit de-assembling the predetermined data block sent from said terminal memory to said buffer memory into a data cell and the packet data sent from said terminal memory into a data cell, for transmitting one of the data cells to the ATM network;

a cell receive control circuit for re-assembling a data cell received from said ATM network into at least one predetermined length data block and store in the buffer memory, and from packet data from the received data cell on said terminal memory received data cell; and a transfer control circuit for instructing said transfer circuit to transfer the predetermined data block between said buffer memory and said terminal memory, and instructing said cell transmit control circuit and said cell receive control circuit to transfer the data cell between one of selected from said buffer memory and said terminal memory and said ATM network through the transmission path.

10. An ATM controller set forth in claim 9 wherein said transfer control circuit reconstructs the data cell received from said ATM network, receives a receive notice indicative of forming a predetermined data block on one of said buffer memory and said terminal memory from said cell receive control circuit, and instructs said transfer circuit to transfer the predetermined data block to said terminal memory in case of reconstructing the data cell on said buffer memory.

11. An ATM controller set forth in claim 9 wherein said transfer control circuit instructs said cell transmit control circuit to transmit the data cell to said ATM network, the data cell being divided and formed of one of the packet data on sid terminal memory and the predetermined data block on said buffer memory to said ATM network.

12. An ATM controller set forth in claim 9 further comprising:

a cell type identifier circuit responsive to receipt of a cell from said ATM network for determining whether the cell is a data cell by analyzing a header section thereof;

rewritable program memory for storage of a control program for use in processing cells other than said data cell; and a microprocessor for execution of processing tasks of those cells other than the data cell as identified by said cell type identifier circuit.

13. An ATM controller set forth in claim 12 wherein said those cells other than the identified data cell at least includes operation, administration and maintenance (OAM) cells plus a resource management (RM) cell.

14. An ATM controller set forth in claim 9 wherein said transfer control circuit is responsive to a nature of traffic at an ATM connection or Virtual Channel (VC) to be established, for selecting one of subdivision of data cell after transfer of the data packet in said terminal memory toward said cell transmit control circuit and conversion of said data packet to a predetermined length data block for storage in said buffer memory while selecting one of transfer of the data cell from said ATM network to said terminal memory after conversion it to packet data at said cell receive control circuit and conversion of said data cell to a predetermined length data block at said cell receive control circuit to thereby form said predetermined length data block in said buffer memory.

15. An ATM controller set forth in claim 14 wherein the nature of said traffic indicates that the data cell is one of a sound, an image, and a data file.

16. An ATM controller set forth in claim 9 wherein said transfer control circuit is responsive to an amount of traffic of said buffer memory for selecting one of transfer of packet data in said terminal memory toward said cell transmit control circuit for subdivision into data cells and conversion of said packet data to a predetermined length data block for storage in said buffer memory while selecting one of conversion of a data cell from said ATM network to packet data at said cell receive control circuit for transmission to said terminal memory and conversion of said data cell to a predetermined length data block at said cell receive control circuit for storage to thereby form the predetermined length data block in said buffer memory.

17. An ATM controller set forth in claim 9 wherein said transfer circuit, said cell transmit control circuit, said cell receive control circuit and said transfer control circuit are incorporated in a large scale integrated circuit (LSI).

18. An ATM controller set forth in claim 9 wherein said transfer circuit, said cell transmit control circuit, said cell receive control circuit, said transfer control circuit and said buffer memory are incorporated in a large scale integrated circuit (LSI).

19. ATM communication control apparatus adapted to be connected between a transfer path of an ATM network and a terminal for execution of processing of an ATM Layer and ATM Adaptation Layer (AAL) plus Physical (PHY) layer of an ATM protocol, said apparatus comprising:

an ATM controller including a buffer memory, a transfer circuit for transfer of packet data between said buffer memory and an internal memory of said terminal with a predetermined length data block being a unit therefor, cell transmit control circuit for sub-dividing said predetermined length data block sent from the internal terminal memory to said buffer memory into data cells for transmission to the ATM network, cell receive control circuit for reconstruction of the data cells received from said ATM network over said transfer path to form in said buffer memory a predetermined length data block, and a transfer control circuit for instructing said transfer circuit to transfer said predetermined length data block between said buffer memory and said internal terminal memory and for instructing said cell transmit control circuit and said cell receive control circuit to transfer said data cell between said buffer memory and said ATM network via said transfer path;

a PHY controller as connected between said ATM controller and said transfer path for executing processing of the PHY layer; and a quartz oscillator for use in driving said PHY controller.

20. ATM communication control apparatus adapted to be connected between a transfer path of an ATM network and a terminal for performing processing of an ATM Layer and AAL Layer plus PHY Layer of an ATM protocol, said apparatus comprising:

a buffer memory;

an ATM controller including a transfer circuit for transfer of packet data between said buffer memory and an internal memory of said terminal with a predetermined length data block being a unit therefor, cell transmit control circuit for subdividing one of said predetermined length data block transferred from the internal terminal memory to said buffer memory and said packet data from said internal terminal memory into data cells for transmission to the ATM network, cell receive control circuit for performing one of reassembly of the data cells received from said ATM network over said transfer path for formation of a predetermined length data block in said buffer memory and formation of the received data cells into more than one packet data in said terminal memory, and a transfer control circuit for instructing said transfer circuit to transfer said predetermined length data block between said buffer memory and said terminal memory and instructing said cell transmit control circuit and said cell receive control circuit to transfer said data cells between one of said buffer memory and said terminal memory and said ATM network via said transfer path;

a PHY controller connected between said ATM controller and said transfer path for executing a processing of said PHY layer; and a quartz oscillator for use in driving said PHY controller.

21. A method for controlling an ATM controller connected between a transfer path of an ATM network and a terminal for performing processing of an ATM layer and an AAL layer of an ATM protocol, said method comprising the steps of:

transferring a data packet to an extent of a predetermined length data block between a buffer memory and an internal memory of said terminal;

de-assembling said predetermined length data block, sent from said internal memory to said buffer memory which stores packet data with at least one de-assembled predetermined length data block, into data cells to be transmitted to the ATM network; and assembling data cells received from said ATM network via said transfer path to form a predetermined length data block in said buffer memory.

22. A method for controlling an ATM controller connected between a transfer path of an ATM network and a terminal for performing a processing of an ATM layer and an AAL layer of an ATM, said method comprising the steps of:

sending data cells to the ATM network in response to a select signal fed thereto by executing one of the substeps of de-assembling a predetermined length data block, sent from an internal terminal memory to a buffer memory which stores packet data with at least one de-assembled predetermined length data block, into data cells, and de-assembling packet data of an extent of the predetermined length data block from said internal terminal memory into said data cells; and performing, in response to said select signal, one of the substeps of assembling said data cells received from said ATM network via said transfer path to form a predetermined length data block to be stored in said buffer memory and form the received data cells as packet data to be stored in said internal terminal memory.

* * * * *